United States Patent
Waupotitsch et al.

(10) Patent No.: US 6,563,499 B1
(45) Date of Patent: May 13, 2003

(54) METHOD AND APPARATUS FOR GENERATING A 3D REGION FROM A SURROUNDING IMAGERY

(75) Inventors: Roman Waupotitsch, Los Gatos, CA (US); Esfandiar Bandari, Mountain View, CA (US)

(73) Assignee: Geometrix, Inc., San Jose, CA (US)

( * ) Notice: Subject to any disclaimer, the term of this patent is extended or adjusted under 35 U.S.C. 154(b) by 0 days.

(21) Appl. No.: 09/356,855

(22) Filed: Jul. 19, 1999

Related U.S. Application Data
(60) Provisional application No. 60/093,335, filed on Jul. 20, 1998.

(51) Int. Cl.[7] ............................................... G06T 17/00
(52) U.S. Cl. ..................................................... 345/420
(58) Field of Search ................... 345/418, 419, 345/420, 423, 424, 426

(56) References Cited

U.S. PATENT DOCUMENTS 5,760,882 A * 6/1998 Gulick, Jr. et al. ............ 355/80

* cited by examiner

Primary Examiner—Cliff N. Vo
(74) Attorney, Agent, or Firm—Joe Zheng

(57) ABSTRACT

Techniques for generating a 3D region from a surrounding imagery are disclosed. The surrounding imagery comprising a sequence of side view images taken respectively at a known position around an object. The images are preprocessed to generate corresponding sequence of mask images. To accelerate the subsequent space carving process, each of the mask images is encoded uniquely using what is called herein a Maximal Area Encoding scheme. In the space carving process, volumetric cells or cubes representing the object are recursively subdivided to gradually fit the object by "carving" away those cubes that are not occupied by any of the object. All cubes are encoded and indexed using an octree structure.

30 Claims, 20 Drawing Sheets

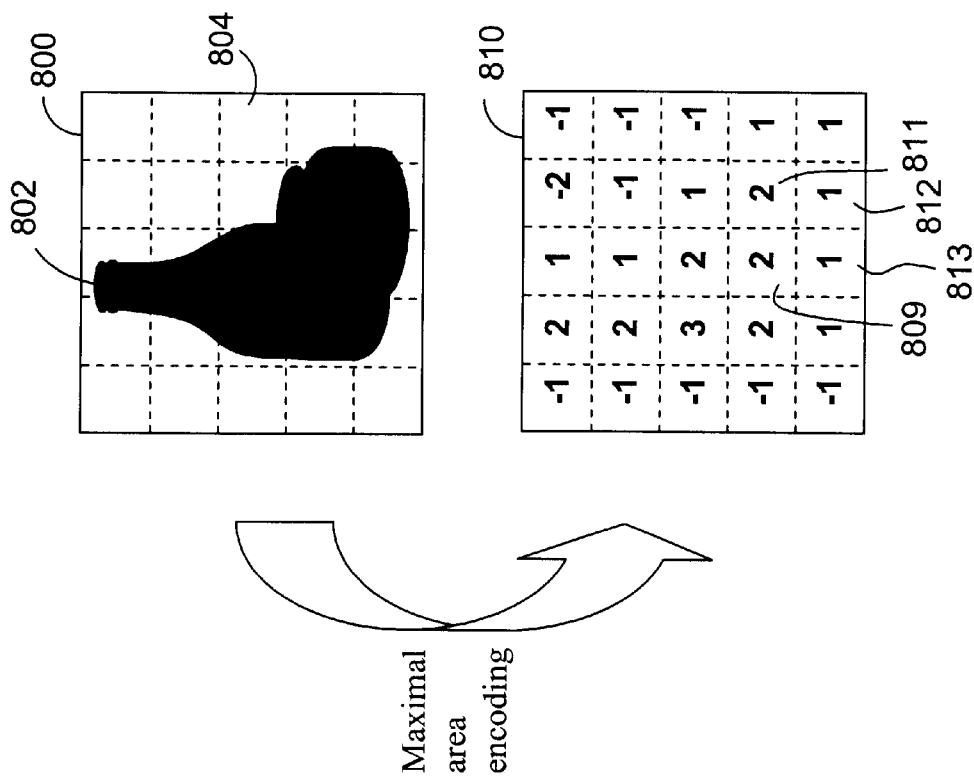

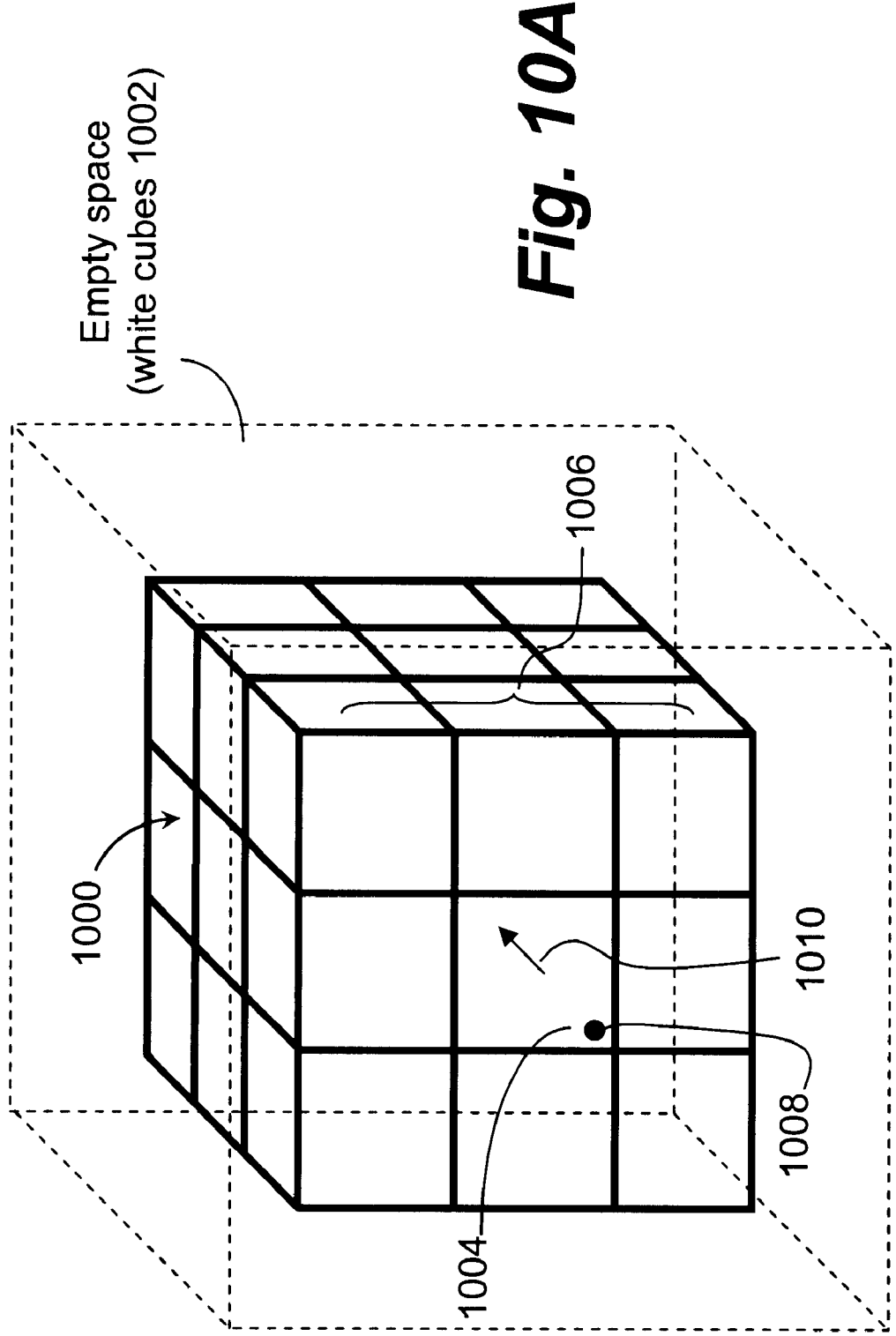

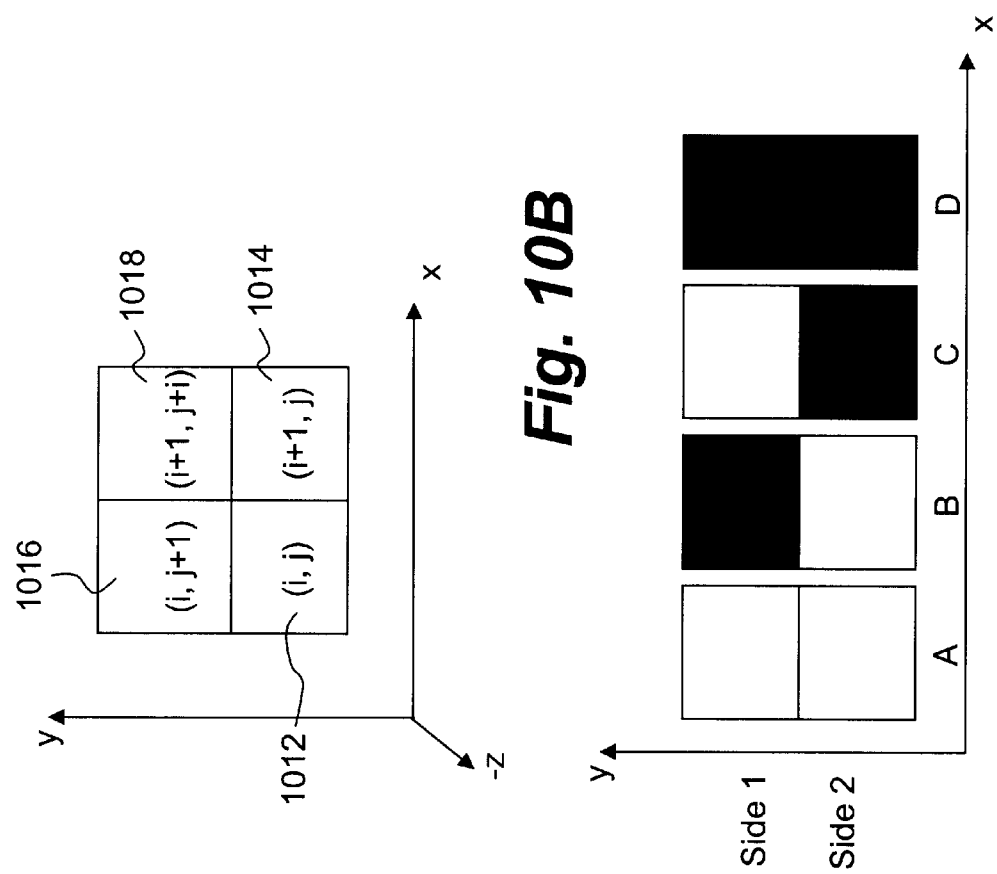
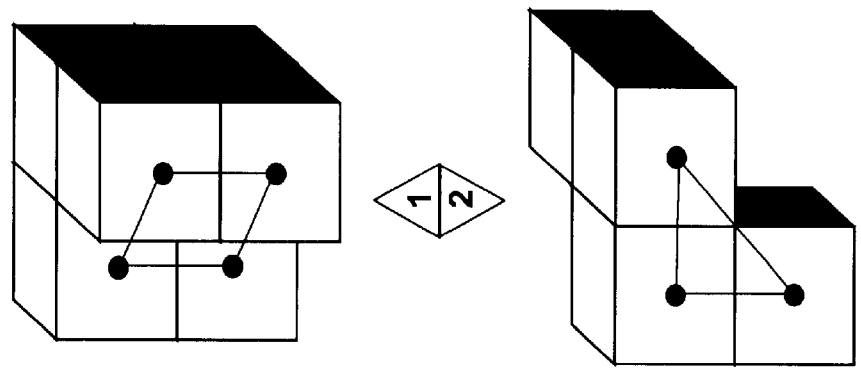
Fig. 10D
Fig. 10B
Fig. 10C

METHOD AND APPARATUS FOR GENERATING A 3D REGION FROM A SURROUNDING IMAGERY

CROSS-REFERENCE TO RELATED APPLICATION

This application claims the benefits of the provisional application, No. 60/093,335, filed 07/20/98, entitled "Generation of Fully-Textured 3D Models System ", which is hereby incorporated by reference for all purposes.

BACKGROUND OF THE INVENTION

1. Field of the Invention

The present invention generally relates to the area of 3-dimensional (3D) image processing and more particularly relates to methods and systems for generating a 3D region from a surrounding imagery.

2. Description of the Related Art

Three-dimensional (3D) models of objects can provide information useful for a variety of applications such as generating computer aided design models from physical objects in product designs, outlining biological structures or organs in medical research and generating digital characters for computer games. Nevertheless, the creation of the 3D models has in the past required highly skilled professionals, extensive artistic knowledge, expensive modeling equipment and laborious efforts.

With the popularity of personal computers and the rapid emergence of the Internet and the World Wide Web (WWW), there are increasing demands from non-professionals for 3D modeling systems that require no extensive knowledge to operate. For example, a business may need to generate 3D models of its products and present them on its www site to attain its e-commerce presence. A game developer may need to create a 3D model of a physical object to use as a realistic character in a computer game. A child may want to generate a 3D image of one of his/her favorite new toys to share by the Internet with a relative living remotely. The various applications and demands have proclaimed features of such 3D modeling systems that must be low in cost and easy in operation.

One of the commonly used 3D modeling systems is a triangulation system projecting beams of laser light onto an object. Ordinarily, the reflected light bounces off the object at an angle relative to the light source. The system employing an imaging system collects the reflection information from a different location relative to the light source and then determines the coordinates of the point or points of reflection by triangulation. A single dot system projects a single beam of light which, when reflected, produces a single dot of reflection. A scanning line system sends a plane of light against the object, the plane of light is reflected as a curvilinear-shaped set of points describing one contour line of the object. The location of each point in that curvilinear set of points can be determined by triangulation. The accuracy of the systems may be high but the systems are costly. The triangulation in the systems requires a precise configuration between the light source and the imaging system. Further the digitizing speed is usually slow when the object is large in size and limited by the mechanics of the scanning system.

Another commonly used 3D modeling approach is a stereoscopic system employing one or more imaging systems located at known locations or distances from each other to take multiple images of a 3D object. The captured images are processed with a pattern recognition system that corresponds the various points of the object in the multiple images and triangulates to extract depth information of these points, thereby obtaining the shape/contour information of the 3D object.

The above systems are either costly or require substantial knowledge to operate and not applicable in many applications that can not afford the cost and complexity. It is therefore a great need for a 3D modeling system that is easy to set up, virtually anywhere within minutes, and operated together with a personal computer, to scan and measure a 3D object and electronically replicate a fully-textured 3D model of the object.

In scanning the 3D object, there are generated images that are typically taken respectively around the object. Each of the images is a corresponding projection of the 3D object. Thus, there is a further need to develop a solution that can automatically and efficiently generate from those images a 3D region representing a volume bounding the object in a 3D space and used in subsequent processing for generating the full-textured model of the object.

SUMMARY OF THE INVENTION

The present invention has been made in consideration of the above described problems and needs and has particular applications for an image-based 3D modeling system that can be used to generate fully-textured models of objects. According to one aspect of the present invention, a surrounding imagery comprising a sequence of side view images taken respectively at a known position around an object. The images are preprocessed to generate corresponding sequence of silhouette or mask images. To accelerate the subsequent space carving process, each of the mask images is encoded uniquely using what is called herein a Maximal Area Encoding (MAE) scheme. In the space carving process, volumetric cells or cubes representing the object are recursively subdivided to gradually fit the object by "carving" away those cubes that are not occupied by any of the object. All cubes are encoded and indexed using a tree structure, such as an octree.

The invention can be implemented in numerous ways, including a method, a system and a computer readable medium containing program code for automatically generating a 3D region from a surrounding imagery. The advantages of the invention are numerous. Different embodiments or implementations may yield one or more of the following advantages.

One of the advantages is the encoding of the mask images using the unique MAE scheme. Each of the encoded values or pixels in one of the encoded images represents a squared area of a mask image that has a same color and is created by incrementing from a neighboring encoded values, resulting in an efficient encoding scheme. Another advantage of the present invention is that the process of deciding the status of each of the cubes (i.e. occupied, unoccupied or partially unoccupied by the object) is performed with respect to the encoded mask images rather than the original mask images, which makes the space carving process independent of the size of the mask images.

Other advantages, objects and features of the present invention, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 6C shows an exemplary collection of "black" cubes (3D region) defines a volumetric boundary of the object in a 3D space;

FIG. 8A shows an encoded image according to the maximal area encoding (MAE) scheme;

FIG. 8C illustrates a projection of a cube onto a plane;

FIG. 10A shows a portion from a 3D region encoded by an octree and intersecting with white cubes that have been carved away in the space carving process;

FIG. 10B illustrates that a given boundary cube is neighbored with three neighboring cubes;

FIG. 10C shows all of the four possibilities in the "neighborhood configuration";

FIG. 10D illustrates, respectively, two examples, one results in a square if all the front cubes are connected and the other results in a triangle if all the front cubes are connected;

DETAILED DESCRIPTION OF THE PREFERRED EMBODIMENTS

Figure 1A:
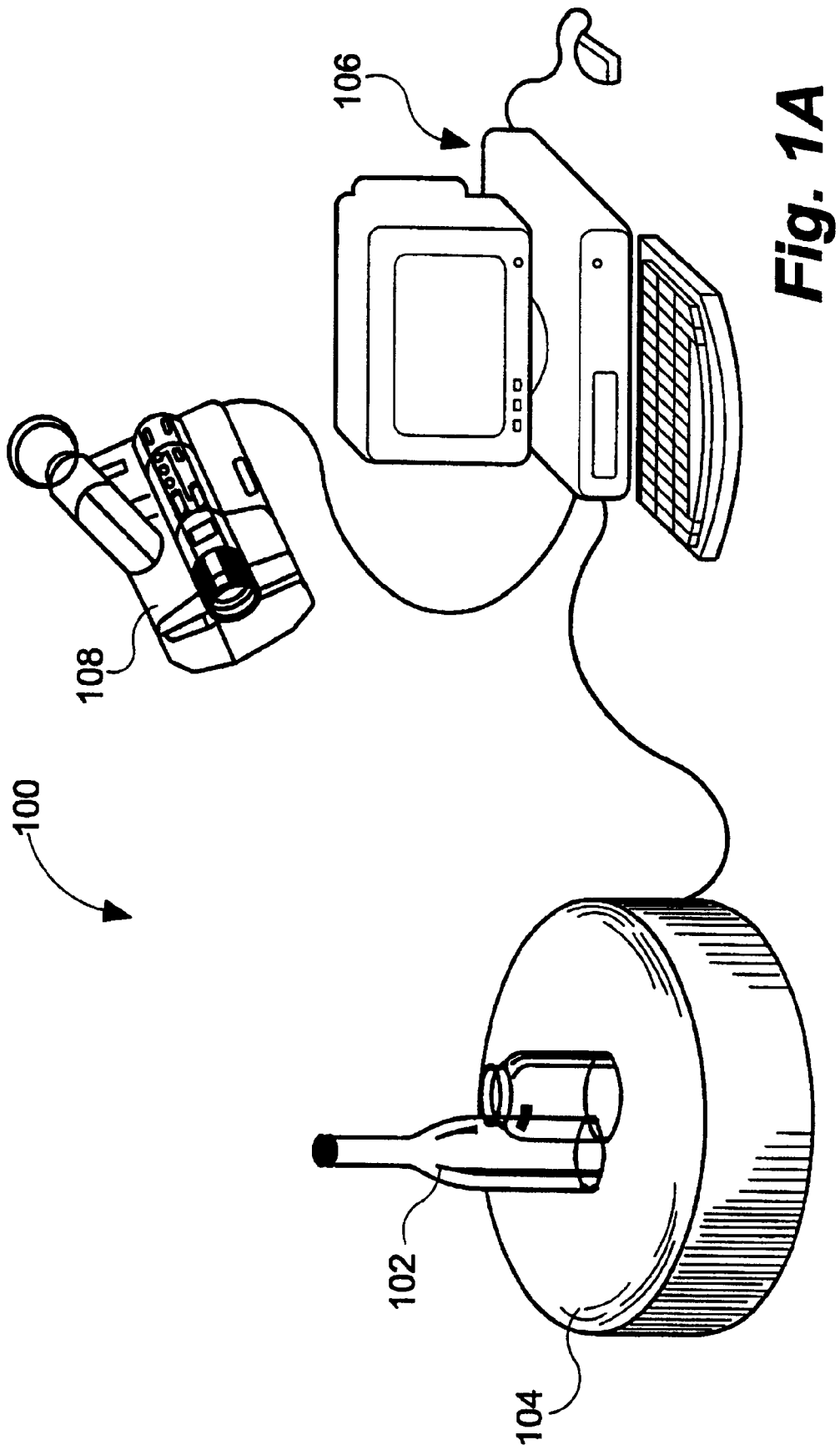
FIG. 1A demonstrates a system in which the present invention may be practiced.

The invention relates to techniques that provide for automatically generating fully-textured 3D models of objects from a sequence of images taken around the objects. A 3D modeling system employing the present invention can be used and operated by an ordinary skilled person to generate fully-textured models of 3D objects within a limited time for many applications including Internet commerce and product designs. Various processes in the present invention are designed to minimize system overhead and reduce computation complexities and thus embodiments thereof can be executed in many computing devices such as a laptop computer and a portable device.

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble data processing in computing devices. These process descriptions and representations are the means used by those experienced or skilled in the art to most effectively convey the substance of their Work to others skilled in the art. The method along with the system and the computer readable medium to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "comparing" or the like, refer to the actions and processes of a computing device that manipulates and transforms data represented as physical quantities within the computing device's registers and memories into other data similarly represented as physical quantities within the computing device or other electronic devices.

A 3D Capturing System and Color Images

Referring now to the drawings, in which like numerals refer to like parts throughout the several views. FIG. 1A shows a system 100 in which the present invention may be practiced. An object 102 to be modeled electronically may be a combination of one or more 3D objects such as toys, products or devices. Object 102 is placed on a turntable 104 that is preferably controlled by a stepper motor (not shown). The stepper motor operates under the control of a computer system 106 to rotate turntable 104 so that object 102, when being turned around, can be viewed and imaged by an imaging system 108 that subsequently produces a surrounding imagery comprising a number of side view images, each taken at a predetermined relative position of object 120 with respect to imaging system 108.

There is no special requirement for turntable 104 to operate together with imaging system 108 and computer system 106. According to one embodiment, turntable 104 is made of round shape and flat surface to avoid possible jittering movement when being rotated. The stepper motor that drives turntable 104 is coupled to computer system 106 through a serial port thereof. Imaging system 108 that is also coupled to computer system 106 through a Universal Serial Bus (USB) or a second serial port thereof may be a digital video camera such as Kodak DVC-323 from Eastman Kodak or an image capturing device that produces digital color image data. In the case that the image capturing device produces only analog signals, those skilled in the art understand that a frame grabber may be installed in computer system 106 to digitize the analog signals so as to produce the digital color image data. Not for limiting the scope of the present invention, it is assumed that computer system 106 receives digital color images data from imaging system 108 in the following description.

Figure 1B:
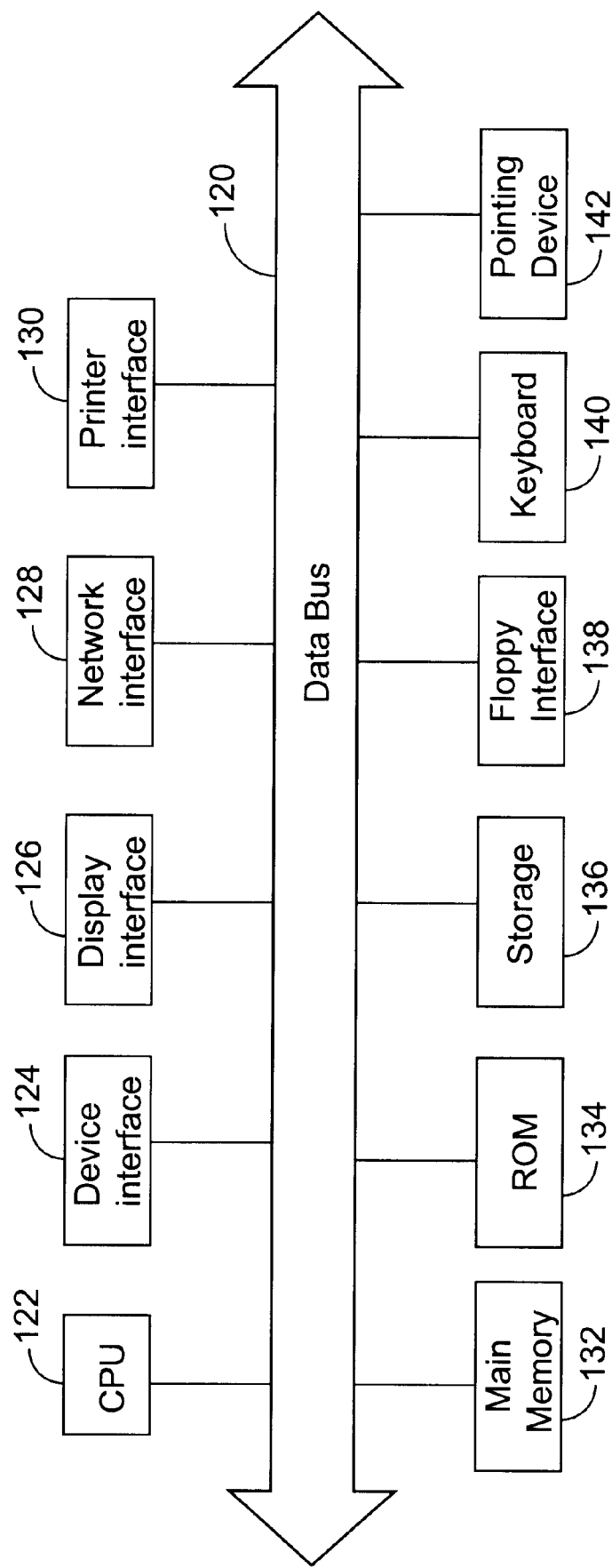
FIG. 1B shows a block diagram of a preferred internal construction of computer system that may be used in the system of FIG. 1A.

Computer system 106 may be a computing system that may include, but not be limited to, a desktop computer, a laptop computer, or a standalone portable device. FIG. 1B shows a block diagram showing a preferred internal construction of computer system 106. As shown in FIG. 1B, computer system 106 includes a central processing unit (CPU) 122 interfaced to a data bus 120 and a device interface 124. CPU 122 executes certain instructions to manage all devices and interfaces coupled to data bus 120 for synchronized operations and device interface 124 may be coupled to an external device such as imaging system 108 hence image data therefrom are received into a memory or storage through data bus 120. Also interfaced to data bus 120 is a display interface 126, network interface 128, printer interface 130 and floppy disk drive interface 138. Generally, a compiled and linked version of one embodiment of the present invention is loaded into storage 136 through floppy disk drive interface 138, network interface 128, device interface 124 or other interfaces coupled to data bus 120.

Main memory 132 such as random access memory (RAM) is also interfaced to data bus 120 to provide CPU 122 with the instructions and access to memory storage 136 for data and other instructions. In particular, when executing stored application program instructions, such as the complied and linked version of the present invention, CPU 122 is caused to manipulate the image data to achieve desired results. ROM (read only memory) 134 is provided for storing invariant instruction sequences such as a basic input/output operation system (BIOS) for operation of keyboard 140, display 126 and pointing device 142 if there are any.

In operation, imaging system or camera 108 produces color image data that is typically represented in three intensity images, such as red (R), green (G) and blue (B) intensity images. Each of the intensity images is an array or matrix of pixels having a value between 0 to 255 if presented in an 8-bit precision. To be specific, each color pixel C(i,j) in a color image is a vector pixel that may be expressed as follows:

$$C(i,j) = [R(i,j), G(i,j), B(i,j)]^T,$$

where (i,j) are coordinates of an image pixel and C refers to a color image and R, G and B are the respective three intensity images or components in color image C.

It is understood that the R, G, and B color image data representation may not be necessarily the best color coordinates for desired computations, there are many other color coordinates that may be particularly useful for one purpose or another. One of them is HSV (hue, saturation and value) or HIS (hue, intensity, and saturation) representation that facilitates the separation of hue, intensity, and saturation from a color image, hence a vector pixel may be expressed as follows:

$$C(i,j) = [H(i,j), I(i,j), S(i,j)]^T.$$

To facilitate the description of the invention, the following embodiments assume that computer system 106 receives color images in the RGB format. The description makes it evident to those skilled in the art when computer system 106 receives other than the RGB format images.

Automated Camera Modeling

One of the features in the present invention is to provide a mechanism that enables a user without specific knowledge and effort to automatically create fully-textured 3D models of objects. When a number of side view images are provided, one of the fundamental problems in deriving the 3D model of the object is to find the projective geometric relationship between object points and image points. The problem is in turn related to the determination of a camera model; a mathematical model that describes how an image is formed, i.e. how points in the 3D space are projected onto an image sensor that result in the images. The determination process is called in the art "camera calibration". To provide a generic solution of deriving the camera model, one of the features in the present invention is the automated camera modeling from a single snapshot of a calibration target without a user's intervention.

Figure 2A:
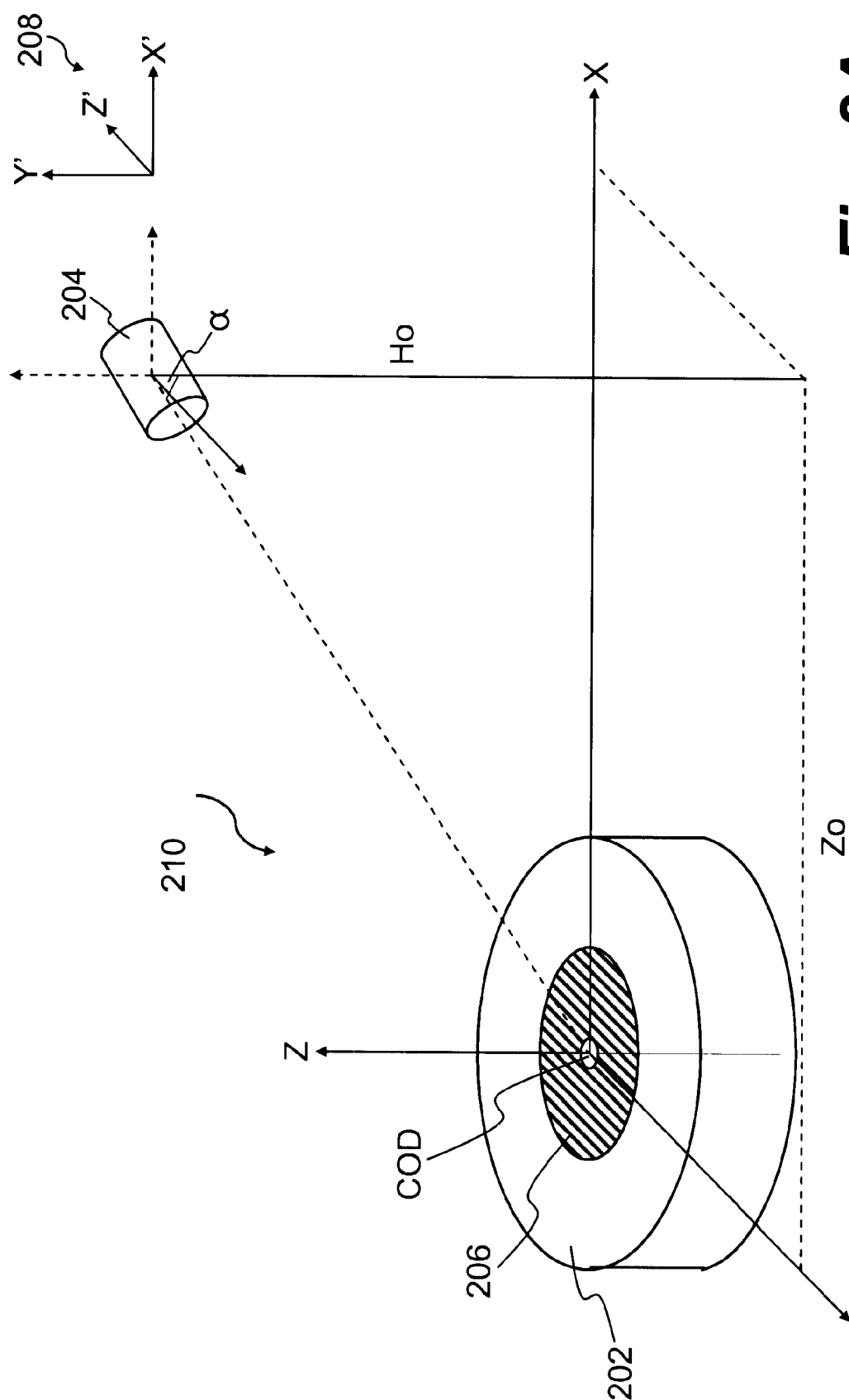
FIG. 2A shows that a turntable is placed within the field of view of (FOV) of a camera viewing or videotaping from an angle looking down toward, and slightly oblique to the turntable.

Referring to FIG. 2A, a turntable 202 is placed within the field of view of (FOV) of a camera 204 that corresponds to imaging system 108 in FIG. 1A and preferably viewed or videotaped from an angle α looking down toward, and slightly oblique to turntable 202. By way of this camera angle α, the perspective view of a disc 206 will result in an ellipse-like shape as viewed by camera 204. Disc 206 is of a round shape and used as the calibration target in deriving the camera model. In particular, there is an opening 208 in the center of disc 206 for securing disc 206 to turntable 202 in a manner that ensures the center of the disc coincides with the center of the turntable. Although there is no specific requirement regarding the appearance of disc 206, it is generally preferable that disc 206 is colored with a uniform and homogeneous color different from the color of turntable 202. For example, the color of turntable 202 may be surfaced with green color while disc 206 may be of white color.

Figure 2C:
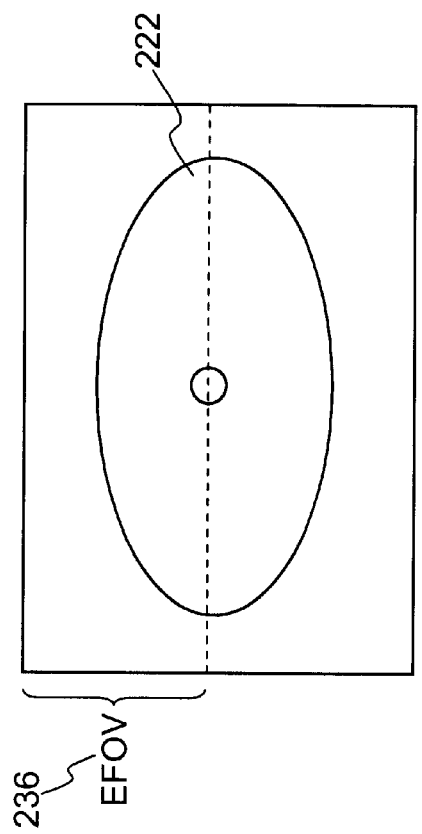
FIG. 2C and FIG. 2D show that the field of view of the camera encloses an entire calibration target in FIG. 2C, resulting in a narrower effective field of view as opposed to the larger effective field of view in FIG. 2D in which one side of the calibration target is ignored (not imaged)
Figure 2D:
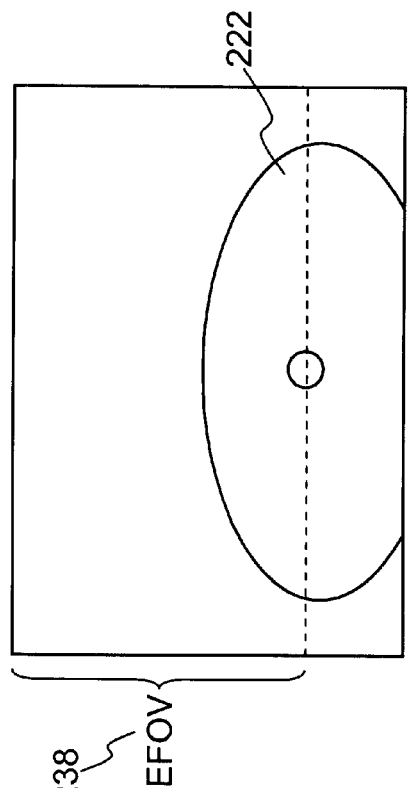
Figure 2B:
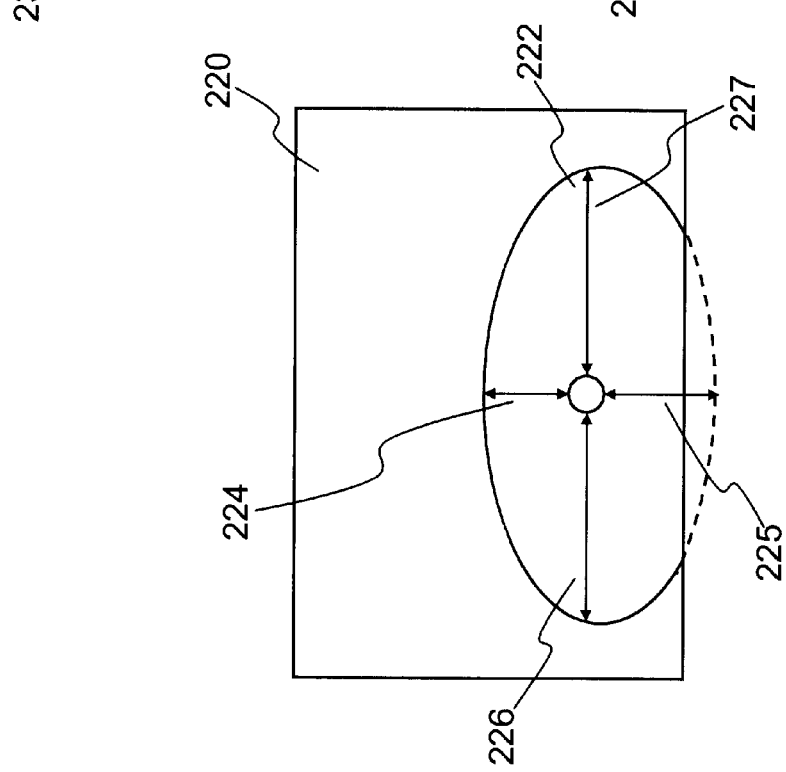
FIG. 2B depicts an image of an ellipse-like shape to show how a disc is perceived by the camera of FIG. 2A.

FIG. 2B depicts an image 220 of an ellipse-like shape 222 to show how disc 206 is perceived by camera 204. The distortions inherently possessed in shape 222 as opposed to disc 206 reflect the effects of several parameters of camera 204 that include the focal length and field of view of camera 204 as well as orientation and position thereof with respect to disc 206.

According to one aspect of the present invention, an observation from the distortions of shape 222 provide the following properties:

1. the minor axes 224 and 255 of shape 222 indicate respectively the projection of the rotation axis of the disc;
2. the respective ratios of the major axes 226 and 227 and minor axes 224 and 225 provide information about the obliqueness of the disc with respect to the viewing direction of the camera, for example, the camera must be positioned directly above the disc if the ratios are unity, (it is noted that minor axis 225 can be derived once the ellipse is extracted); and
3. the projections of the center of the disc (COD) and the center of the shape (COS) are generally not coincidental because of the foreshortening effects of the perspective projection of the camera. The COD is generally projected above the COS in the FOV of the camera.

Figure 3:
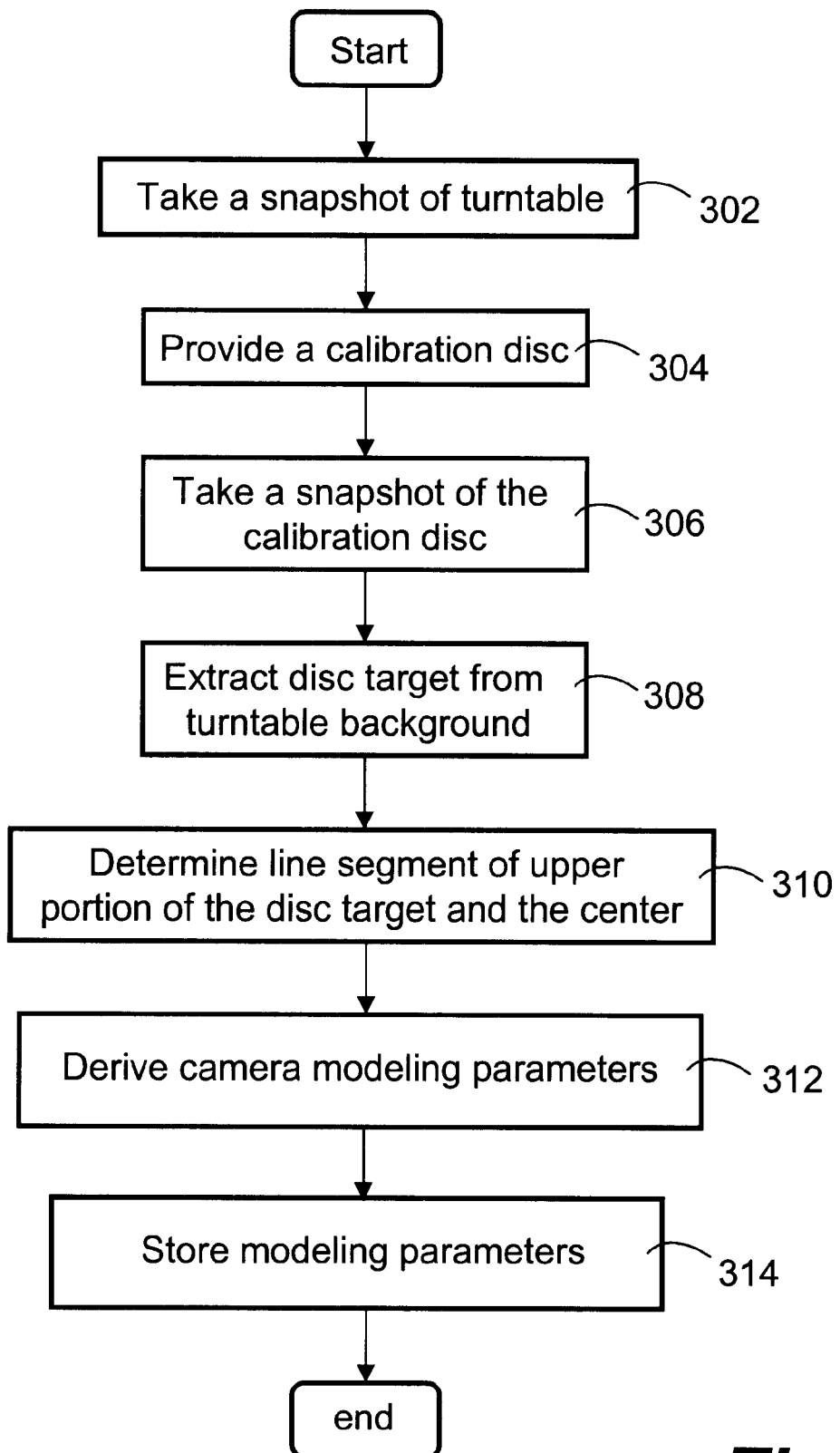
FIG. 3 shows a process flowchart of deriving the camera model according to one embodiment of the present invention and should be understood in conjunction of FIGS. 2A and 2B.

With the above properties, FIG. 3 shows the process flowchart of deriving the camera model according to one embodiment of the present invention and should be understood in conjunction of FIGS. 2A and 2B. It is assumed that the stepper motor has been calibrated, namely the angle at which the object is positioned is known. At 302, turntable 202 is first imaged by camera 204 to obtain a reference image Cr. Calibration disc 206 is then placed on the turntable at 304 and a snapshot thereof is taken at 306 to obtain a calibration image Cd. As described above, to take one of the advantages provided in the present invention, the center of the FOV of the camera does not have to be aligned with the center of the calibration disc. In other words, the camera needs to image only the upper portion of the calibration disc including the center.

At 308, the reference image Cr is subtracted from calibration Cd to obtain a target image Ct. It is understood that the subtraction process is not a simple subtraction of one image from another image and essentially means a removal of the reference information in Cr from Cd to isolate the disc target. As a result of the subtraction process, target image Ct now includes only the disc target with background pixels set to a predefined value. It should be noted that there are a number of approaches to perform the subtraction process, including the conversion of both color images Cd and Cr to a more appropriate color space such as HIS as such effects of miner differences in luminance and chrominance signals are minimized. Further, additional processing, such as noise. reduction, may be applied to the target image Ct to remove noise. The resultant image Ct is preferably an upper portion of the disc target including the center.

At 310, a process that may include edge detection/thinning, binalization and line fitting is applied to the target image Ct. These processing methods are familiar to those skilled in the art and hence not to be described in detail herein. A preferred format of the target image Ct is binary with only the lines being white and the rest being black as illustrated in FIG. 2B.

Based on the known geometry of the calibration disk and the measured major axes a and minor axes 224–227 along with the above three properties, a computation process can be constructed to estimate uniquely the following parameters at 312:

(a) the angle between the rotation axis of the calibration disc and the ray connecting COD with the camera center (obliqueness);
(b) the viewing angle subtended by a pair of image rays extending to the two end points of the minor axis;
(c) the angle in the image plane subtended by the axis of rotation of the disc target and the vertical image direction, and
(d) the distance Zo and height Ho of the camera.

Referring to FIG. 2A, it is generally known that there are two coordinates systems in use to facilitate the determination of the camera position with respect to the calibration disc. Axes X' and Y' of the camera coordinates system (X', Y', Z') 208 are aligned with the image axis and axis Z' points oppositely towards the viewing direction. The origin of the scene coordinates system (X, Y, Z) 210 is centered at COD such that axis Y is that rotation axis of the disc. The axis X and −Z lie in the plane of the calibration disc with axis X parallel to axis X' of the camera system. Thus together with the above properties 1–3 and for (c), the camera FOV can be computed. Using the angles specified in (a) and (b) and the FOV, the well known 3×3 rotation matrix between the coordinate systems of the camera and the scene can be computed in three elementary rotation steps. Further using the FOV, the major and minor axes a and b of the target disc and the rotation matrix, the translation vector between the two coordinate systems can be computed. The value may be specified up to a scaling factor, or if the size of the calibration disc is known, the absolution translation can be specified. The derived parameters or the camera model is stored in memory at 314 for use when the coordinates of the object in the scene space are determined from images.

There may be other ways to determine the parameters in the camera model. What is important herein is that the present invention is designed to depend only on three of the four end points of the ellipse-like shape, namely an upper portion of the disc target including the center. In other words, one of the features in the camera calibration technique disclosed herein does not require a full disc target in the view.

More importantly, having a field of view of a camera to cover an entire calibration target means that the camera has to have a narrowed effective field of view. FIG. 2C shows that the field of view of the camera encloses the entire calibration target, resulting in a narrower effective field of view 236 as opposed to the effective field of view 238 in FIG. 2D in which one side of the calibration target is ignored (not imaged). As a result, the effective field of view 238 in FIG. 2C is larger than that in FIG. 2B. Having a larger effective field of view provides more freedom to place the object on the turntable and further better image resolution on the object.

The automated camera modeling in the present invention provides a means for users to set up the configuration illustrated in FIG. 1A with minimum effort. Once the camera and the turntable are relatively positioned with respect to each other, the system can automatically derive, with a calibration disc placed on the turntable, the camera model that provides a maximum effective field of view.

Acquisition of Images

Once the camera model is determined, the relative position between the camera and the turntable must be maintained intact. Preferably, the illumination condition remains the same when the object is imaged. It is generally understood that an image of the object is a two-dimensional projection of the 3D object and cannot provide sufficient information to uniquely reconstruct the profile of the 3D object. Hence, the next step is to take images around the object.

Figure 4:
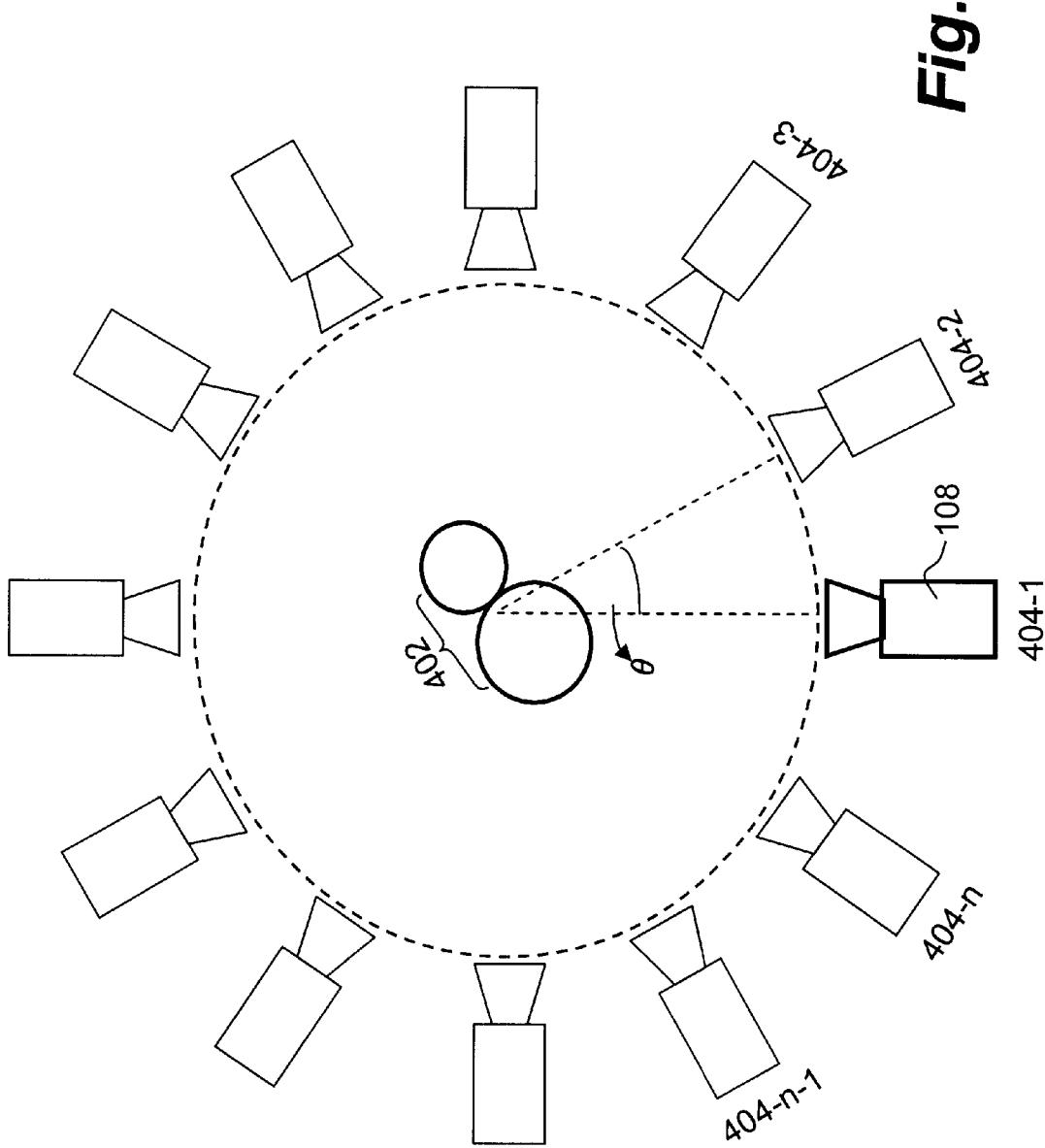
FIG. 4 depicts a simplified top plan view of FIG. 1A.

As illustrated in FIG. 1A, 3D object 102 is imaged by camera 108 and the output image data from camera 108 are loaded to computer 106 for processing. FIG. 4 depicts a simplified top plan view of FIG. 1A. Position 404-1 is where camera 108 is positioned for determining the model thereof and is referred to as the initial position. Upon receiving a trigger signal from computer 106, a first image C1 of object 402 (102) is acquired and then downloaded to storage of computer 106. When the downloading is complete, computer 106 sends a control that causes the motor in the turntable to rotate the turntable a predefined angle θ. In other words, the relative position between the turntable and the camera is now changed by the rotation angle θ. For illustration purpose, FIG. 4 depicts that camera 108 is repositioned to position 404-2. Equivalently, object 402 is rotated clockwise by the rotation angle α while camera 108 is still at position 404-1. Then a second image C2 of object 402 is acquired and downloaded to the storage of computer 106. When object 402 rotates a circle, there are n images (C1, C2... Cn) generated, each capturing a side view of object 402 at a known position. For example, there are 24 images when rotation angle θ is set to 15 degrees.

With all the images stored in the storage, computer 106 starts the 3D modeling process by processing the stored images sequentially and/or in parallel as described below.

Space Carving Process

Figure 5:
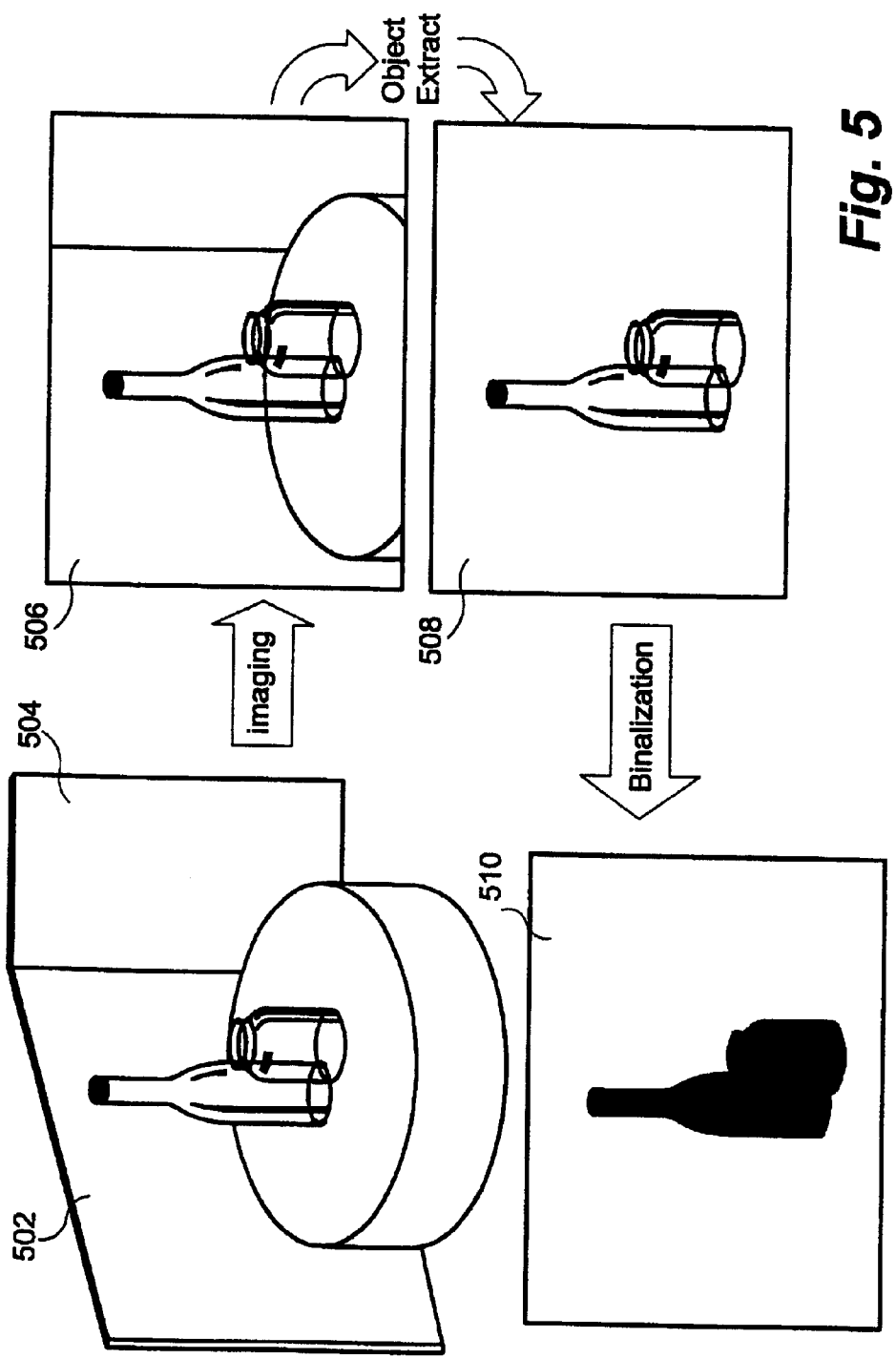
FIG. 5 illustrates that a background the camera sees is now a stationary and uniformly colored panel.

The present invention requires no specific background for the object. Nevertheless, a background having rich colors could warrant additional analysis. For the efficiency of the 3D modeling process, the background is simple, preferably with a uniform and homogeneous color. According to one embodiment, one or two panels 502, 504 are used to block possible color disturbance from a complicated background. Hence the background the camera sees is now stationary and uniformly colored panel as shown in an image 506 in FIG. 5. To increase subsequent processing efficiency, the background portion is subtracted from image 506 to produce image 508 that has only the object of interest.

There are a number of approaches to subtract the background from image 506. According to one embodiment of the present invention, a scene without the object is first imaged to generate a reference image Cr that is analyzed to determine the color ranges for each part in the background image. The ranges are preferably expressed in hue, intensity and saturation. When image 506, namely one of the n images (C1, C2 ... Cn), is available, it is first transformed to the HIS color coordinates where color pixels are respectively compared to the reference color ranges.

Typically, the color pixels are turned to a first predefined color, for example, white e.g. [255 255 255] when the color pixels are substantially close to the color ranges. The color pixels are preserved or turned to a second predefined color, for example, black (e.g. [0 0 0]) when the color pixels representing the object portion are substantially different from the color ranges of the background. As a result, image 508 is converted to a binary image 510 with black pixels representing the object and the white pixels representing the background, hence image 510 sometimes simply referred to as a silhouette or mask image.

There are now n object images and a corresponding number of respective mask images derived from side view images (C1, C2 . . . Cn). As each of the mask images is a projection of the 3D object onto a specific 2D plane; the group of the mask images inherently constrain a 3D region in which the 3D object exists. Hence a volumetric analysis is now proceeded along with the respective mask images. The volumetric analysis herein is to determine the vertices of the surface of the 3D object in a 3D space. The vertices of the 3D object define a volumetric boundary of all the volumetric cells in a 3D space so as to define the 3D region.

According to one embodiment of the present invention, the resultant 3D region is expressed in terms of volumetric cells or voxels that are shaped as cubes. As will be appreciated below, the cubes are recursively subdivided in conjunction with back projection to each of the mask images to fit into the 3D region up to a predefined precision. As one of the features of the volumetric analysis in the present invention, all the cubes are encoded with respect to an oct-tree or octree, and the back-projection process is made to be independent of the size of the mask images through an unique encoding process.

A space carving process is devised to perform the volumetric analysis. Intuitively, a 3D object is assumed to fit within a single cube in a 3D space. The single large cube now needs to be carved gradually in order to fit the object properly. The carving process starts with subdividing the cube into smaller cubes and compares each of the smaller cube with each of the mask images. The resultant carved model is referred to as a 3D region of the object.

Each cube is sequentially compared with each of the mask images to determine where the extra volumetric spaces need to be carved away. According to one embodiment, three types of color are used to label a cube. The set of rules to label a cube is as follows:
1. a cube is labeled "white" when the cube is not occupied by the object or any portion of the object;
2. a cube is labeled "black" when the cube is entirely occupied by the object or any portion of the object; and
3; a cube is labeled "gray" when the cube is partially occupied by the object or some portion of the object.

It should be pointed out that cubes labeled in such way are only for identifications and there may be many other ways to identify cubes for facilitating the space carving process.

According to the above rules, the initial single cube is labeled as "gray" because the cube is only partially occupied by the object. The cube is then subdivided into eight smaller cubes 602 as shown in FIG. 6A. For simplicity, all eight cubes are of equal size.

Ring 604 surrounding eight smaller cubes 602 indicates a trace that there are n respective mask images successively positioned around, each representing a side view of object 600. Mask image 606 being shown therein is one of the n mask images and has a silhouette of object 600 projected thereon. The mask images respectively surrounding object 600 are now used to decide the color of each of cubes 602.

To be specific, what is used is called back projection, namely to back project sequentially the cubes against each of the mask images. For example, for one mask image 608 in FIG. 6B, the cubes are back projected to create a projection image 610 thereof. The dashed lines 612 indicate the boundaries of the cubes. According to the rules above, each of the cubes is colored accordingly with respect to mask image 608. It is shown that four of the projected eight cubes are partially occupied by a portion of object 600 and therefore are labeled "gray". The other four are not occupied at all, so they are labeled "white".

The same procedure is repeated with respect to each of the mask images. If a projected cube is empty with respect to at least one of the mask images, the cube is labeled "white". If a projected cube is always occupied with respect to each of the mask images, the cube is labeled "black". If the projected cube is partially occupied in some of the mask images and fully occupied in the rest of the mask images, the cube is labeled "gray". The $1^{st}$ and $2^{nd}$ rules in the set above may be restated as follows:
1. a cube is labeled "white" when the cube is not occupied by the object or any of the object with respect to at least one of the mask images;

2. a cube is labeled "black" when the cube is entirely occupied by the object or any of the object with respect to each of the mask images.

It may be understood that the "gray" cubes may be caused by the boundary of the object and shall be further divided up to a predefined degree of refinement to decide the boundary. The same procedure can be recursively applied until the cubes are subdivided up to the refinement, then the collection of "black" cubes define a volumetric boundary of an exemplary object in a 3D space as shown in FIG. 1C.

Figure 6B:
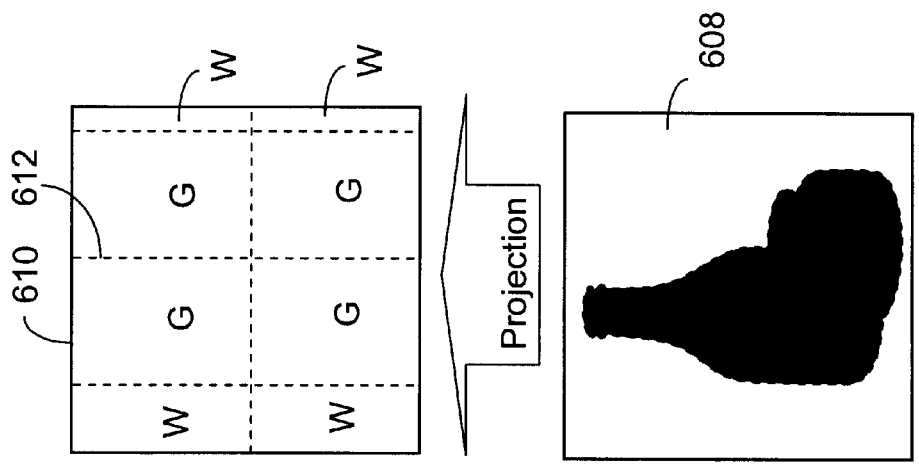
FIG. 6B shows that a projection of the cubes is compared with one of the mask images to determine the color of each of the cubes.
Figure 6A:
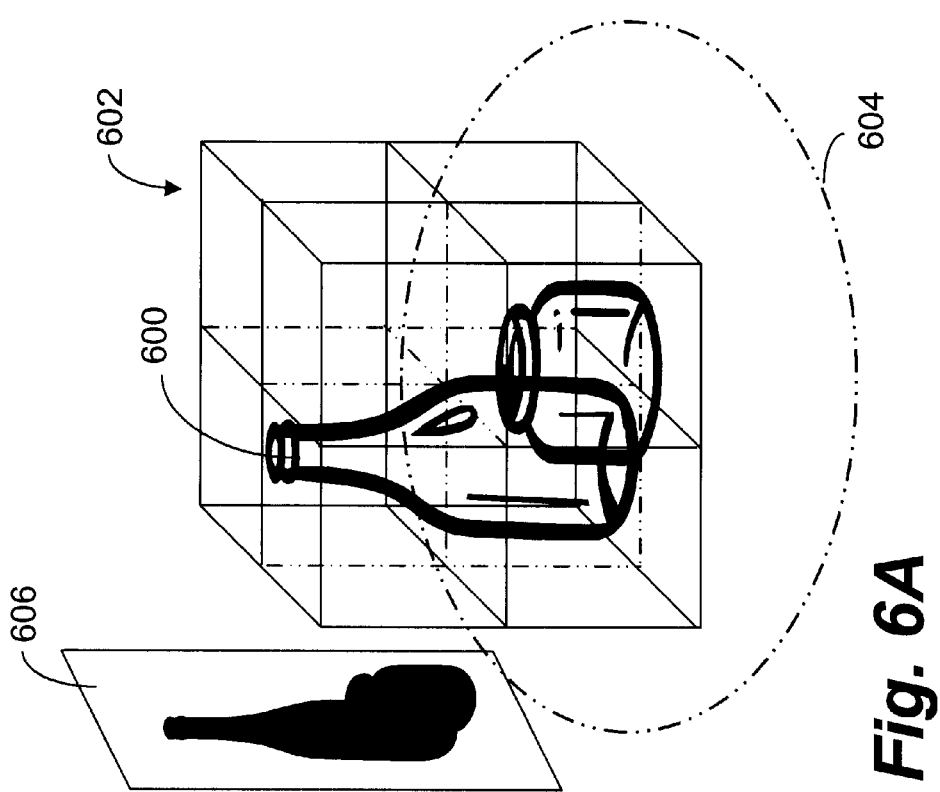
FIG. 6A shows a cube divided into eight smaller cubes for further determination of the color of each of the smaller cubes with respect to the surround mask images.
Figure 7A:
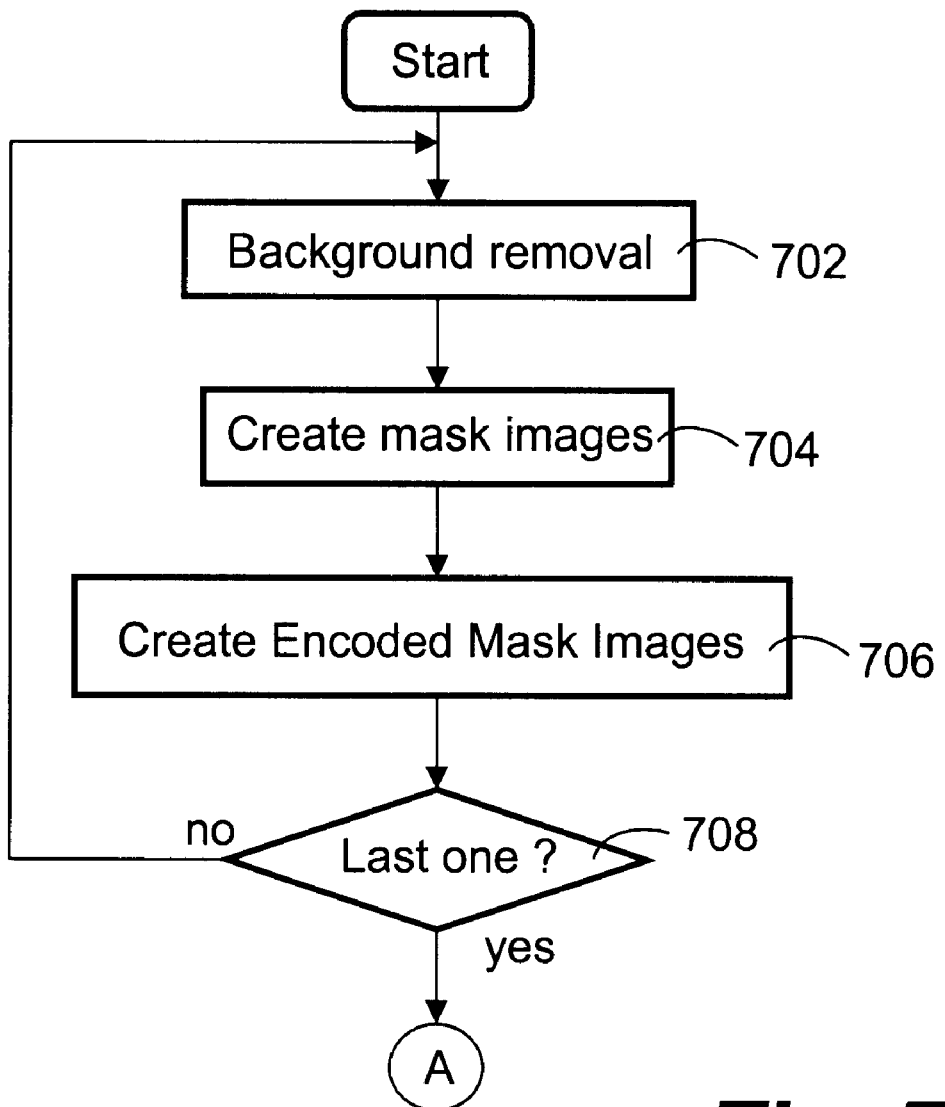
FIGS. 7A–7B show a flowchart of the space carving process according to one embodiment of the present invention.
Figure 7B:
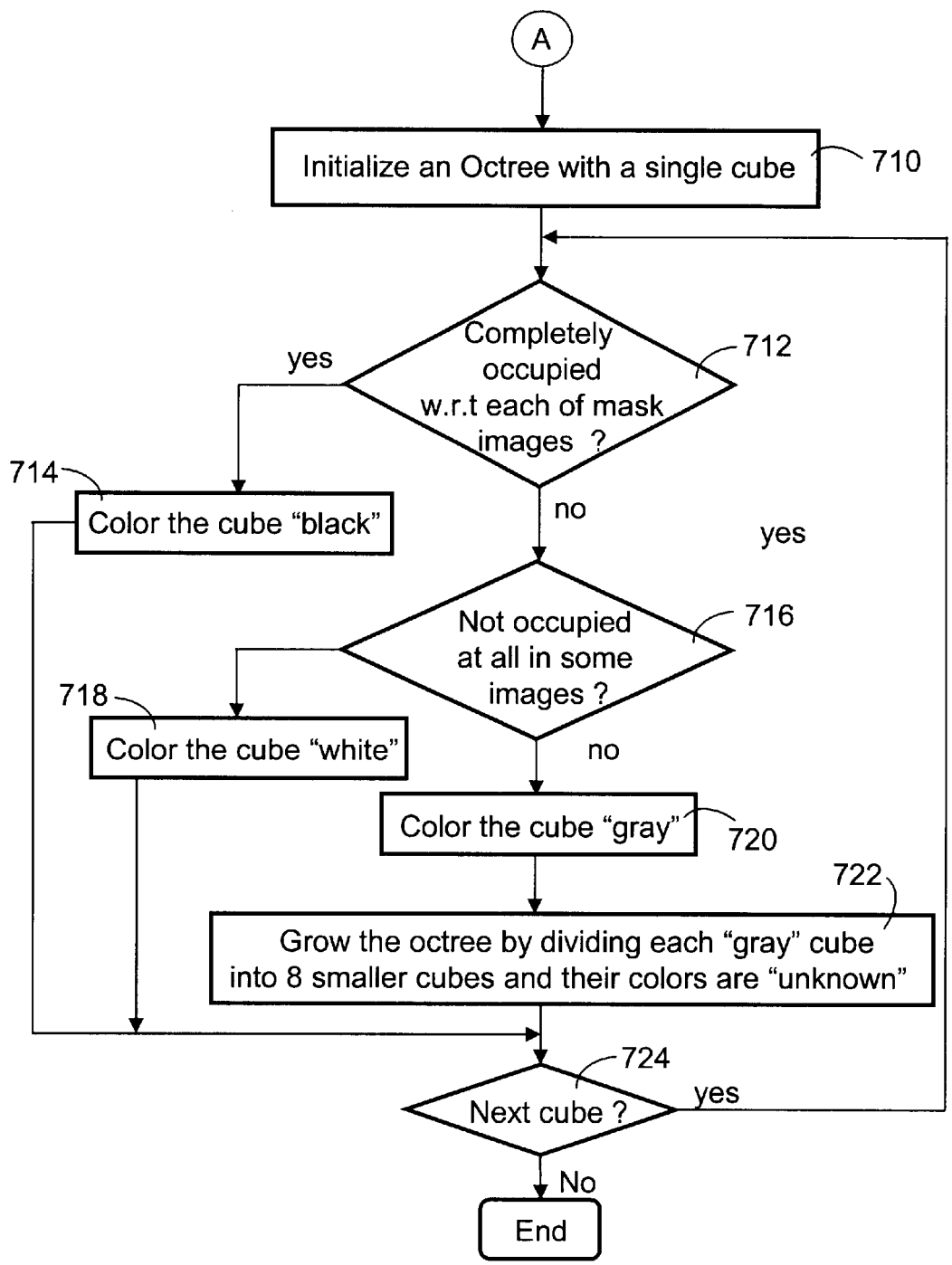

FIGS. 7A–7B show a flowchart of the space carving process according to one embodiment of the present invention and should be understood in conjunction with FIGS. 6A–6B. After a surrounding imagery of the object is generated, the background information is respectively subtracted from each of the images at 702. Each of the subtracted images is further processed to generate respective mask images at 704.

The back-projection process described above is performed based on image pixels, namely the color of each of the projected cubes is determined by looking up the image pixels in the foreground portion of each of the mask images. When the mask image is of large size, the pixel-based processing can be considerable lengthy.

According to one embodiment, each of the mask images is encoded at 706 using what is referred to herein as Maximal Area Encoding (MAE) scheme. As one of the features in the present invention, the MAE scheme can improve substantially the processing speed of determining the color of each of the cubes.

Figure 8B:
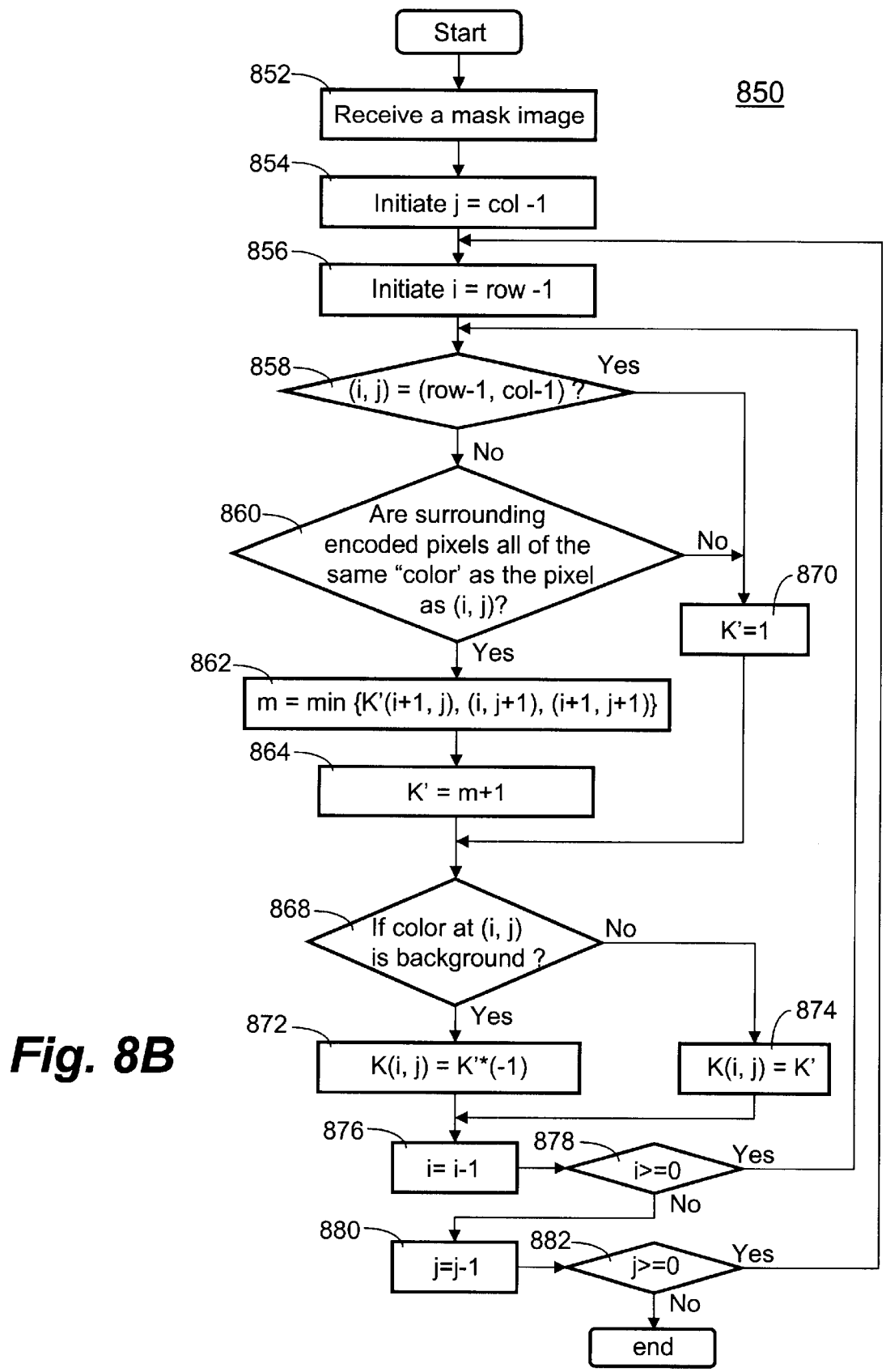
FIG. 8B illustrates what is called herein a Maximal Area Encoding (MAE) process.

Referring now to FIGS. 8A and 8B, there are respectively shown an example of the MAE scheme and the process flowchart. Image 706 is one of the mask images and includes foreground 802 being the silhouette and background 804. To simplify the illustration, image 800 is assumed to be of a size of 5 pixels by 5 pixels and hence each block formed by the dashed line is a pixel.

Encoded image 810 shows the result after the MAE scheme. Each image pixel in encoded image 810 is now an integer representing the largest square that has the same color. To be precise, the absolute value of integer k at coordinates (i,j) in encoded image 810 describes the largest square such that every image pixel (i+a, j+b), for $0 \leq a < k$ and $0 \leq b < k$, has the same color as the pixel at (i,j). To identify if an image pixel belongs to the foreground or the background, the example in FIG. 8A uses negative and positive numbers, respectively, for the background and the foreground.

FIG. 8B illustrates the encoding process flowchart 850 and shall be understood in conjunction with the encoded result in FIG. 8A. Each of the mask images is received or accessed at 852. For example, all the mask images are stored in a memory space and accessed by process 850 sequentially and respectively. According to one embodiment, each of the mask images has a size of col-by-row, for example, 640 columns and 480 rows, and the process starts with the last image pixel at (col-1, row-1). At 854 and 856, coordinates (i,j) for an encoded value are therefore initiated at (col-1, row-1). At 858, the process ensures that coordinates (i,j) will not go beyond the boundary of the image. Logically, the process will go to 870 when it just starts. At 870, an intermediate value K'=1, i.e. on the background, is a preassigned encoded value at coordinates (i,j). At 868, the image pixel at (i,j) is determined if it is on the background or the foreground. If the image pixel at (i,j) is on the background, the encoded value at coordinates (i,j) K is assigned to be the intermediate value K' at 872, otherwise K is assigned to be the opposite of K', namely K=K'×(×1) at 874. At 876, the coordinates for the next value to be encoded is at (I−1, j), left to (i,j). The process now starts again at 865 and passes to 860 that checks the values. In this case, it only checks the encoded value at (i+1, j), (i,j+1), and (i+1, j+1). At 862, a smallest value of these encoded value is obtained. The intermediate value K' is assigned to be an increment of the smallest encoded value by one at 864.

The rest of the process at 868, 872 or 874, 876 and 878 are similar and have been described above. However, when the last line of a mask image is done, the process will branch out from 878 to 880 to decrement j by one to move to a line above and starts at 856. Then the process continues along the line untill the very first pixel is processed. What is important here is the judgement at 860. The process checks if the neighboring encoded values correspond to the same color (either the background or the foreground) as the pixel at (i,j) of the mask image. If one of the neighboring encoded values is not the same, the encoded value will be either 1 or −1, otherwise it will be just an increment of the smallest value among the absolute value of the neighboring encoded values, for example, among the neighboring encoded values 2, 3 and 4, the smallest value 2 is incremented to 3, or among the neighboring encoded values −2, −3 and −4, the value (−2) is incremented to (−3). It can be appreciated that the computation of the process increase linearly in the number of pixels in the mask images.

Specifically, when encoded pixel value 809 of FIG. 8A is considered, the process checks the neighboring encoded values 811–813 and all of them are on the foreground. The minimum value of the neighboring encoded values is 1 according to 862 and hence the intermediate vale K' is a 1-increment of the minimum value according to 864. The encoded pixel value 809 is finalized at 874 through 868 and 872. It is now evident to those skilled in the art to verify other encoded values in encoded image 810 of FIG. 8A by the process in FIG. 8B.

The above description of process 850 is suitable for implementation by a recursive programming. Those skilled in the art may appreciate, from the description above, that the MAE scheme may be implemented in a different way, which shall result in a different flowchart and does not affect the operation of the invention. It should be pointed out that the objective that the MAE scheme provides is not affected by the various implementations. In essence, the MAE scheme achieves a constant processing speed for determining colors of the cubes regardless the size of the mask images as further described below.

Returning back to FIG. 7A, all mask images are ensured to have been encoded according to the MAE scheme at 708. Now for every cube, it is respectively determined if it is being occupied by the object or any of the object using an octree encoding structure.

Figure 8C:
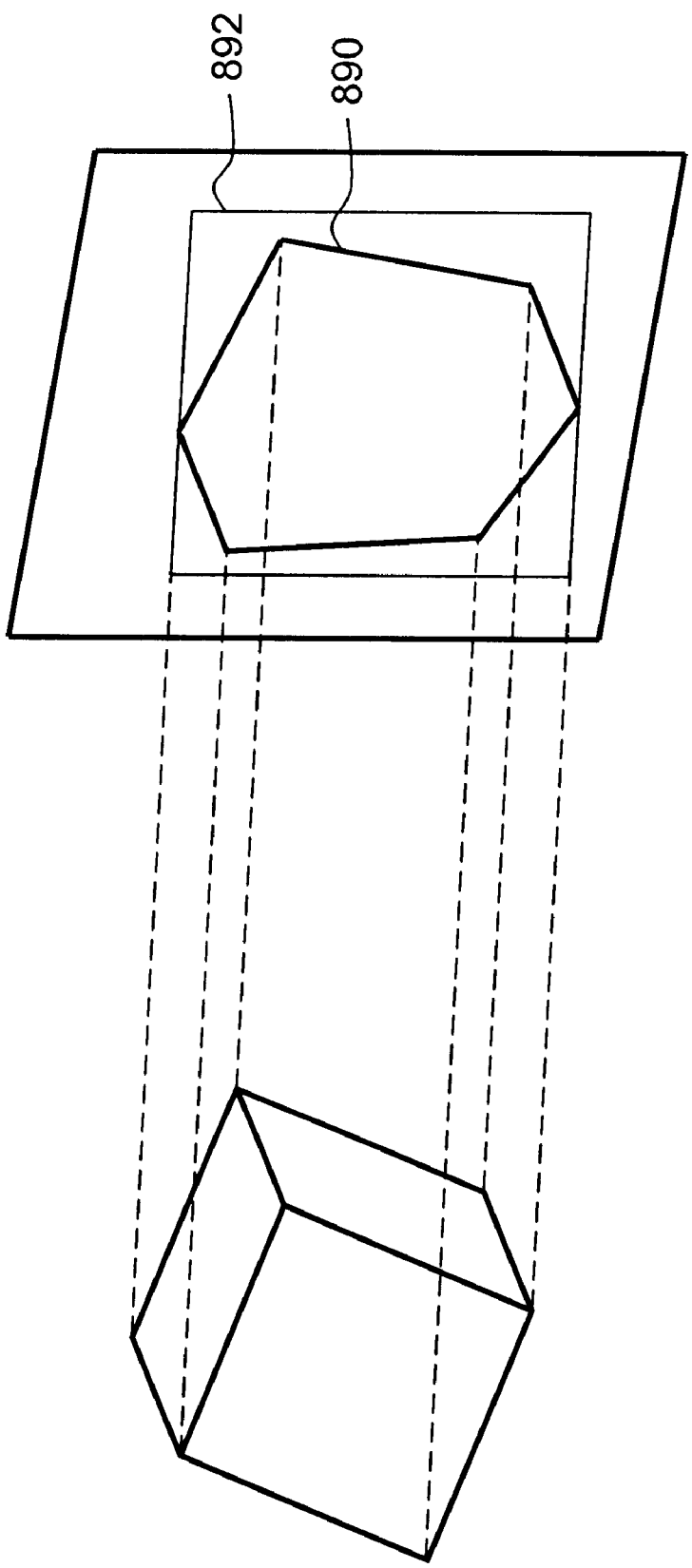
FIG. 8C shows an exemplary octree used to encode a 3D region of an object.

At 710, a node of the octree is established to reflect that a single cube is being examined. At 712, the cube is projected with respect to each of the mask images as described above. To be specific, if there are 36 mask images, that means that the object has been imaged around at every 10 degrees. For each of the 36 images, the cube is projected onto a plane in parallel to the each of the 36 images, resulting in a projected cube whose corners define a polygon 890 as shown in FIG. 8C. A smallest axis aligned square 892 that encloses polygon 890 is compared to the corresponding encoded mask image to determine how the polygon is occupied, namely fully or partially occupied or not occupied at all. It should be noted that the advantage of the encoded mask image is being utilized by using the smallest square that encloses the polygon because the comparison between the square and the mask image is now based on the encoded integers rather than on image pixels. The processing time is substantially decreased.

If the polygon is fully occupied with respect to each of the mask images, the cube is labeled "black" at 714. If it is not fully occupied, the cube is further checked at 716. If the cube is not occupied at all, the cube is labeled "white" at 718. Otherwise, the cube is labeled "gray" and subject to being divided into eight smaller cubes at 720.

Figure 7C:
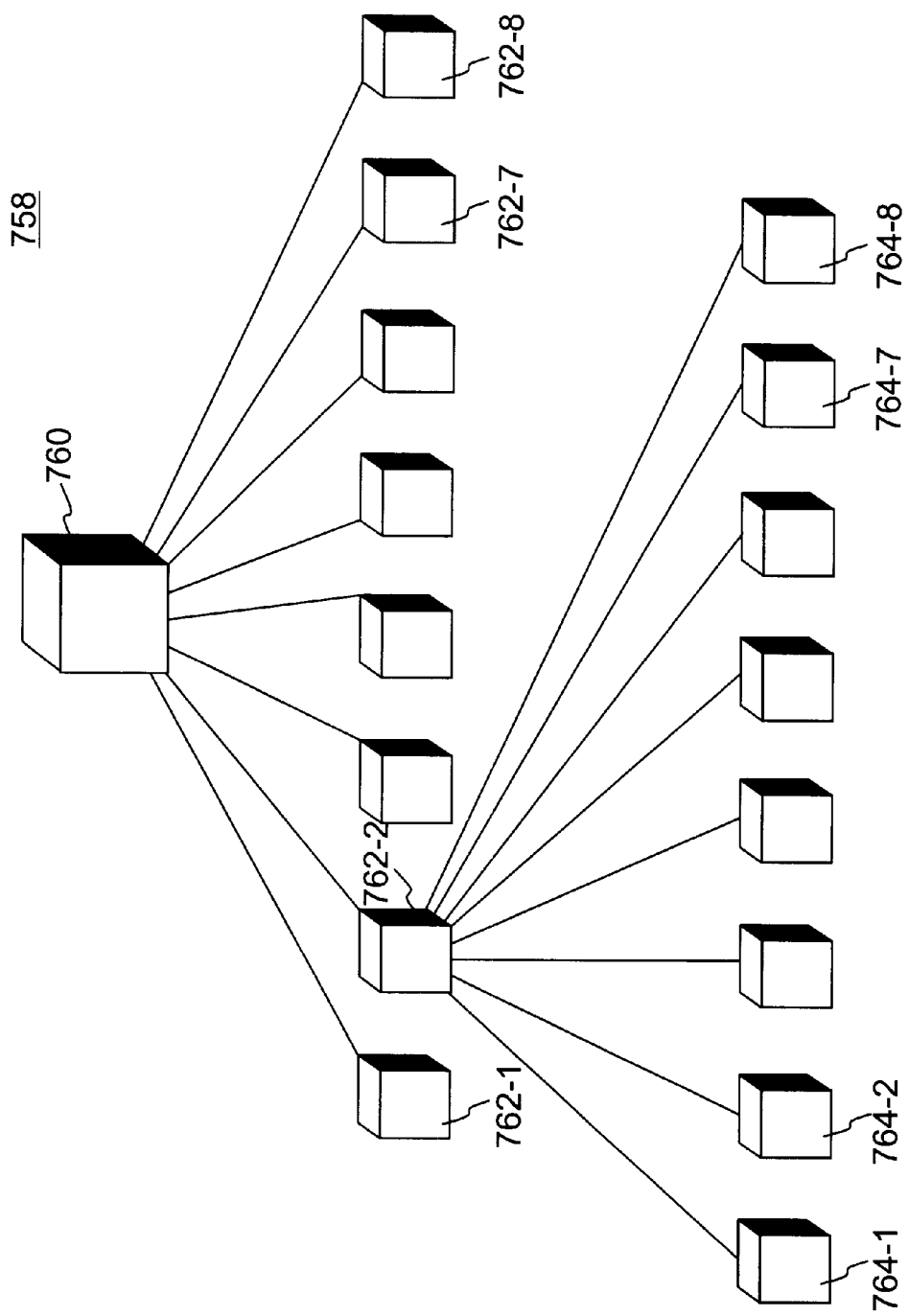

To fully understand the process, a corresponding octree 758 is illustrated in FIG. 7C in which node 760 represents a single cube. Each node or leaf in octree 758 corresponds to a cube, a node, a leaf or a cube are therefore interchangeably used herein. After the single cube is divided into eight smaller cubes, node 762 has accordingly eight leaves 762. If one of the smaller cubes 762-2 is further divided into eight even smaller cubes, leaf 762-2 becomes a node and is further subdivided with eight leaves 764. It can be appreciated, octree 758 grows as the cubes are recursively divided and further the divided cubes are meanwhile encoded with the respective nodes or leaves.

At 720 of FIG. 7B, the cube that is neither fully occupied nor vacant is labeled "gray". As indicated in octree 758, only the gray cube will be further divided and projected for comparisons with respect to each of the mask images. Therefore, the octree, or the node representing the gray cube, is extended by dividing the gray cubes at 722. Because a cube has been divided into eight smaller units, the color of each of the eight units has now yet to be determined based on the occupancy. At 724, the process checks if there are any cubes that must be labeled for an appropriate color, i.e. if there exists a cube with color "unknown". If such cube exists, it is projected for comparison with respect to each of the mask images at 712. If it shows from each of the mask images that the cube is fully occupied, the cube is labeled "black" at 714 and the process then moves to the next cube at 724. If it shows from each of the mask images that the cube is not fully occupied, the cube is further checked to see if it is entirely or partially unoccupied at 716. If it is entirely unoccupied in at least one mask image, the cube is labeled "white" at 718 and the process then moves to the next cube at 724. If it is partially occupied in some of the mask images and fully occupied in the rest of the mask images, the cube is labeled "gray" at 720 and the gray cube is further divided into eight units to repeat the process until a predefined precision threshold is reached. As a result, a volumetric representation or 3D region of the 3D object is carved as an example shown in FIG. 6C and all the cubes are encoded in corresponding octree 758.

Generation of a 3D Mesh Model

Before creating a fully textured 3D model of an object, a description of the surface of the object is needed. Typically, a mesh model of the object is a desired description of the surface, as it provides the information how each localized area is oriented and positioned in a scene or object coordinate system so that corresponding texture information may be applied thereto to generate subsequently a fully textured 3D model. Further, a mesh model may be used as a basis to create a display or reproduction of the real world object and generate other displays such as "morphs", fantasy or special effects.

The generation of a 3D mesh model is a process that generates a mesh model of an object by dividing its 3D surface into a set of small triangular (or quadrilateral) elements. The meshing process disclosed herein is a process that converts an object region encoded in a volumetric form, such as an octree, into a surface mesh or wire frame. One of the advantages of the process is the elimination of any preprocessing of the object region, thus overall performance of generating a fully textured 3D model is substantially improved. Another advantage is to enable an automatic generation of a complete mesh model of a 3D object without user input or intervention. The disclosed mesh generator takes as input only one required item, namely, a specification of the 3D volumetric representation or the octree and results in a complete mesh model therefrom.

Referring to octree 758 in FIG. 7C, it can be observed that all the nodes are in one of the three colors, "black", "white" or "gray". The "black" ones mean that the corresponding cubes are fully occupied, the "white" ones mean that the corresponding cubes are not occupied at all and thus have been carved away, and the "gray" ones mean that the corresponding cubes are partially occupied and could, in theory, be further divided into even smaller cubes for color determination. Given the desired degree of refinement, octree 758 is ceased to grow further. Now it can be appreciated that the nodes of octree 758 that have children (leaves or nodes) correspond to "gray" cubes and those ending nodes having no children are either in "black" or "gray" or "white".

To facilitate the description of the meshing process, it is assumed that every boundary cube of the octree is at the same level of refinement. It should be pointed out that this assumption is not an implied limitation of the present invention. Those skilled in the art understand that the assumption can readily be made by further subdividing boundary cubes or nodes at a lower refinement level (i.e. higher level in the octree) and the description can be equally applied when the boundary cubes are not at the same level of refinement. The implementation of the process without explicitly subdividing the cube that are not at the lowest level of refinement becomes evident to those skilled in the art with the following description.

Figure 9:
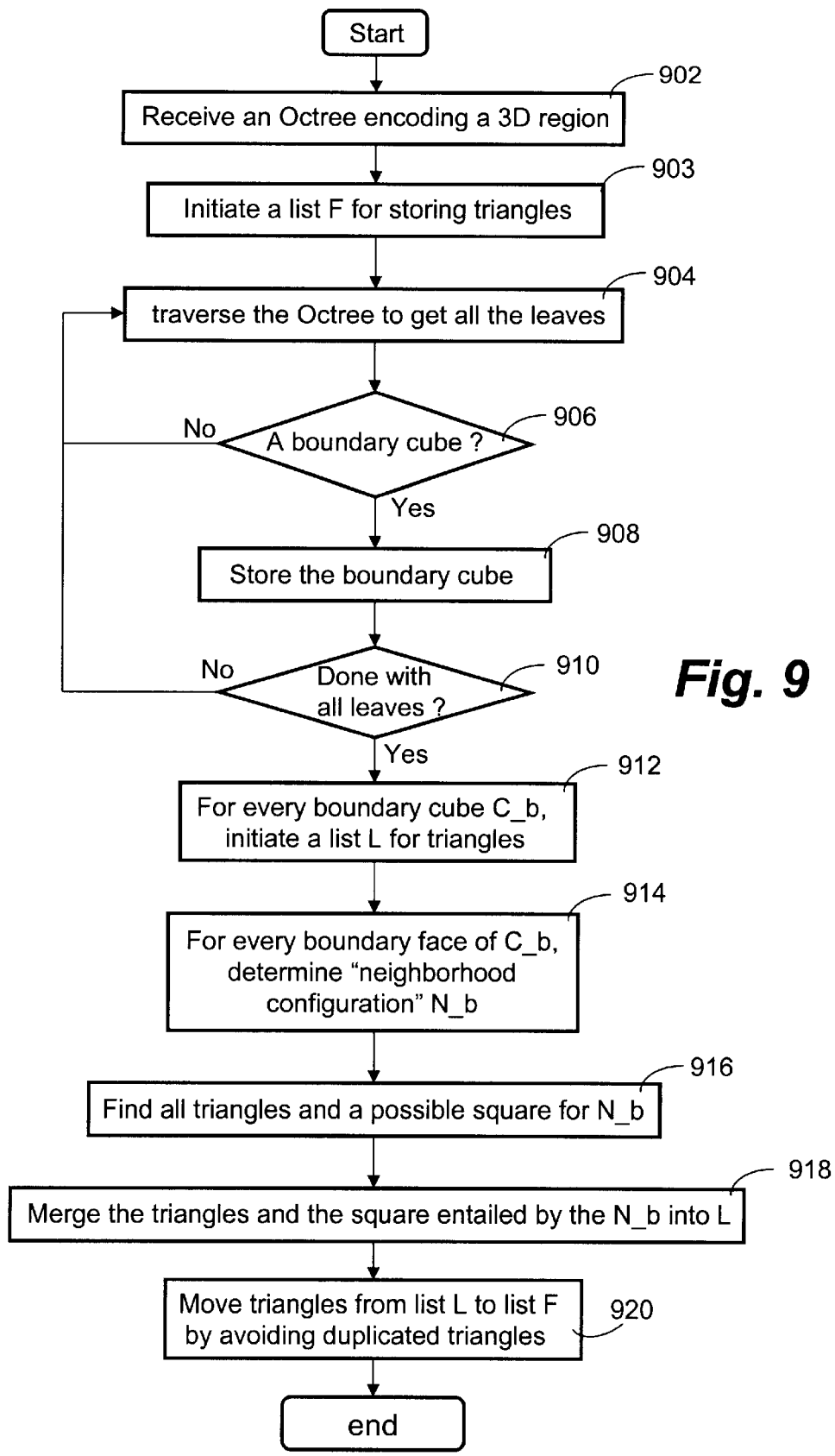
FIG. 9 shows a meshing process flowchart according to one embodiment of the present invention.

FIG. 9 shows a meshing process flowchart according to one embodiment of the present invention. At 902, an octree encoding a 3D region is received. The octree as shown in FIG. 7C is an example having multiple layers of nodes, some nodes have children resulting from a gray cube being further divided. The number of children is exactly eight, namely there are eight sub-nodes to each of the nodes that have children. Each of the nodes in the last layer that have children is called a leaf. Since the result of the meshing process is a collection of triangles, a list F in a memory space is initiated for storing the triangles at 903. The list may be a table to index all the triangles.

At 904, the octree is traversed to find all the leaves that represent either "black" or "gray" cubes. Those who are familiar with the octree data structure know that a recursive process may be implemented in a computer language to retrieve all the leaves. At 906, each of the leaves is examined to determine if it belongs to a category of "boundary cubes". The boundary cubes are referred to those cubes that have at least one side incident to white cubes. To facilitate the description, parameters of a boundary cube are further defined as follows:

- a "boundary face" is a face shared by a black and white cube, a gray and white cube, a black cube and the boundary of the original single big cube, or a gray cube and the boundary of the original single big cube; and
- a "face normal" for the boundary face of a boundary cube is the vector normal to the boundary face with its origin in the face and pointing into the cube.

FIG. 10A shows a portion 1000 from a 3D region encoded by the octree and intersecting with white cubes 1002 that have been carved away in the space carving process described above. Portion 1000 includes a number of cubes with a front layer of cubes 1006 representing the surface of the object intersecting with white cubes surrounding cubes 1002. Exemplary cube 1004 in the front layer has six sides or faces with one side incident to white cubes 1002 and therefore is classified as a boundary cube. In fact, cubes in the front layer 1006 facing white cube 1004 are all boundary cubes and encoded by some of the leaves in the octree. According to the definitions above, cube 1004 has a boundary face 1008 that has a face normal 1010.

At 908 of FIG. 9, the determined boundary cubes are stored for further processing. At 910, a decision has to be made if the octree has been completely traversed. If there are more leaves to be retrieved for the determination of a boundary cube, the process goes to 904 otherwise the process goes to the processing of all the boundary cubes.

At 912, a temporary list (memory) L is initiated, for every of the boundary cubes, for storing triangles. At 914, one of the boundary cubes C_b is processed with respect to what is called "neighborhood configuration".

"neighborhood configuration" is referred to herein as a process, for a given boundary cube, to choose one of its boundary faces, look at the face in the direction of the "face normal" and to determine what relationship the one of its boundary faces has immediate neighbors. Or alternatively, as a result of the "neighborhood configuration", all possible relationships of the given boundary cube with its immediate neighboring cubes are determined. If it is assumed that an angle of rotation around this axis "face normal" which is "natural", i.e. the edges of the face are aligned with the x and y axis of the viewing plane and the face has coordinates (i,j), the 3 neighboring faces will be (i+1,j), (i,j+1), (i+1, j+1). For a specific boundary face f_c, the distance along the face normal to the boundary of the initial cube is considered. There are four faces f_c which share a face with f_c and have the same distance as f_c (except for boundary cases). Of these four faces, the two which have coordinate (i+1,j) and (i,j+1) are considered. In addition, a third face (i+1,j+1), namely the one which shares an edge with both (i+1,j) and (i,j+1), is considered. Each of the latter three faces can be a face of zero, one, or two black (grey==black) cubes. In the case of one black cube, the cube can be either "in front" or "in the back" of the face.

FIG. 10B illustrates that a given boundary cube 1012 is neighbored with three neighboring cubes 1014, 1016, and 1018. For each face, for example, face F, it can be incident to two immediate neighbors 1016 and 1014, both can be zero black cubes (i.e. all white cubes), one black cube, or two black cubes. As mentioned above, all gray cubes at the finest level are treated as "black" cubes. In the case of one black cube, the cube can be either "in front" or "in the back" of the face. FIG. 10C shows all of the four possibilities in which each case is labeled "A", "B", "C" and "D" respectively. These four possibilities are the "neighborhood configuration". Every neighborhood configuration is triangulated in a way that guarantees non-intersecting triangles are resulted.

To be more specific, FIG. 10D illustrates, respectively, two examples, one results in a square if all the front cubes are connected and the other results in a triangle if all the front cubes are connected.

With the definition and configuration above, referring now back to FIG. 9, at 914, the "neighborhood configuration" for a boundary face of a boundary cube is determined, which entails either zero, one, or two triangles, or one square as a result at 916. Specifically, for a specific boundary cube c_b, the neighborhood configuration for all of its boundary faces is considered. Every neighborhood configuration entails a set of triangles or squares. At 918, it is needed to combine these triangles and squares and perform an analysis which guarantees non-overlapping and non-intersecting triangles resulting in the set of final triangles for c_b. The specific analysis performed is implementation dependent and can be implemented by a person skilled in the art. Examples of the analysis may include processes of removing duplicated triangles and enforcing the subdivision of a square into two triangles if a given triangle intersects (i.e. shares three vertices) with a square. The remaining squares in list L are subdivided into two triangles in an arbitrary fashion. According to one embodiment, it is guaranteed that the resulting set of triangles is non-intersecting or overlapping, as well as that every triangle is unique and bounds a volume that has the same orientation (i.e. order of vertices).

Similarly, triangle list F is established for the entire set of boundary cubes. Before moving triangles from the list L to the triangle list F, all the triangles in the list L shall be sequentially checked with respect to the triangles in the triangle list F. If there are any duplicated triangles in the list L, these duplicated triangles will be discarded, otherwise they are added to the triangle list F. The list F may contain triangles that do not bound a volume, there triangles are called dangling and membrane triangles that can be removed with methods known to those skilled in the art. The process goes repeatedly from 912 to 920 for each of the boundary cubes, as a result, the triangle list F now has all the triangles bounding the surface of the 3D object.

Texture Mapping

The addition of texture patterns to 3D models enhances the realism of the models immensely. The process itself is called texture mapping, an image synthesis technique in which one or more 2D images, also known as texture images, are mapped onto a surface of a 3D mesh model. Therefore, the next step, after the 3D mesh model is obtained, is to apply corresponding texture patterns to the surface of the mesh model. Although there have been several texture mapping techniques around, one of the important features in the texture mapping disclosed herein is the generation of patches with continuous texture mapping without user intervention. Another important feature is a mechanism provided to export the patches in a commonly used image file that can be subsequently modified with an image processing application.

Figure 11A:
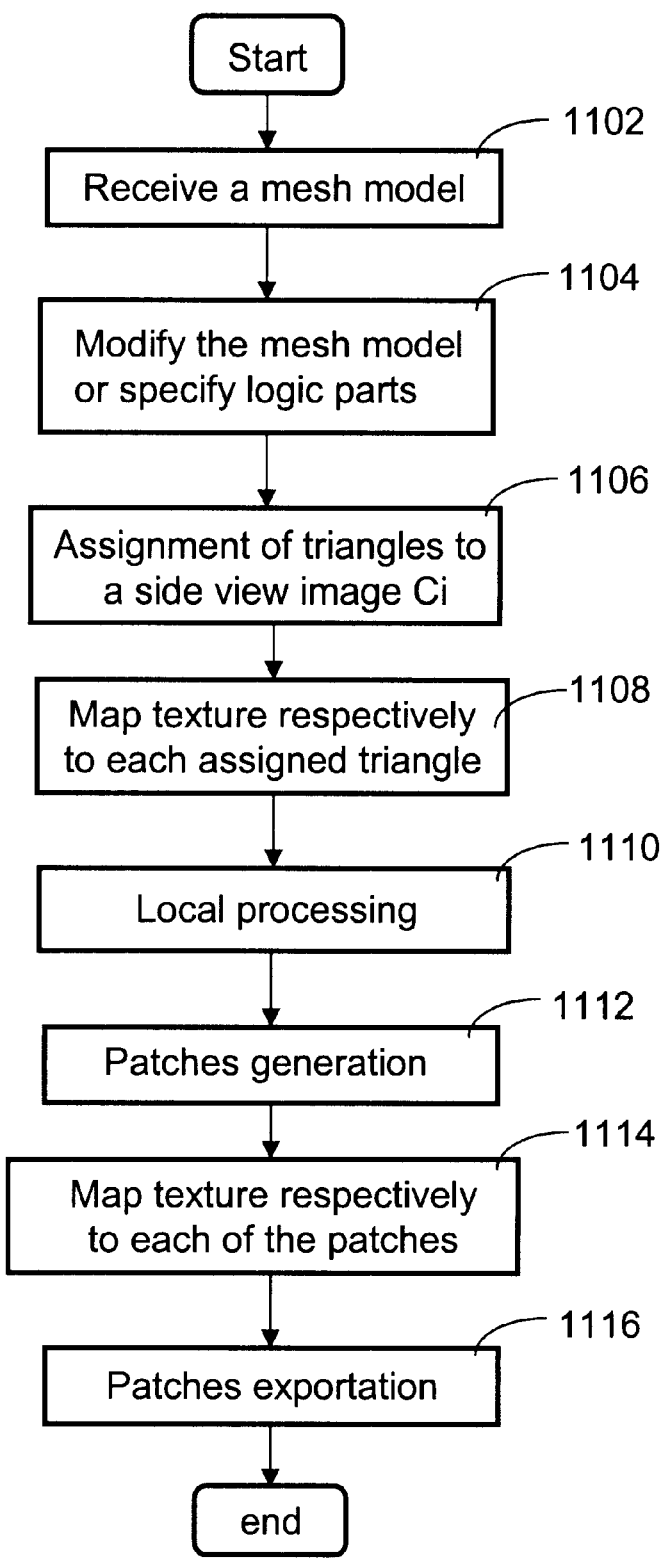
FIG. 11A shows a process flowchart of applying the texture patterns to a mesh model.

FIG. 11A shows a process flowchart of applying the texture patterns to the mesh model. At 1102, a mesh model is received and preferably described in triangles. It should be pointed out that those skilled in that art will appreciate that the texturing process disclosed herein works with a mesh model of other shapes of polygons. Although in the preferred mode, these polygons are triangular, in other modes, they may be rectangular, hexagonal or the like. When using polygons of order greater than three, special steps may be required to ensure that all of the vertices lie within a common plane. Essentially, higher order polygons can be reduced to triangles (polygons of order 3) for convenience in processing. To facilitate the description of the texturing process, the mesh model is assumed to be of triangles and those skilled in the art will appreciate that the description herein is equally applied to a mesh model with polygons of order greater than three.

Preferably, the mesh model may be modified at 1104, depending on a desired resolution or a degree of refinement. The approach used at 1104 may include a decimation process which according to a set of rules reduces the number of triangles to facilitate an efficient and effective texture mapping process to be followed. The rules may include a normal comparison between two or more neighboring triangles. If a normal of one triangle is similar to a neighboring triangle within a predefined degree of refinement, the corresponding triangle may be merged together with the neighboring triangle. In addition, a user may subdivide the mesh model into one or more logic parts for texture mapping at 1104 either within the current process or using a commercially available tool, such as 3D Studio MAX in which the mesh model can be displayed and interacted with.

At 1106, each of the triangles, based on the normal thereof, is assigned to a side view image $C_i$. To be specific, FIG. 12A shows a group of triangles being assigned to respective side view images. As described above, a surrounding view of the object has been captured in a number of side view images $C1, C2, \ldots CN$, each taken at a known position relative to the object. Based on the normal of each of the triangles and the known angle of each of the side view images, each of the triangles can be respectively assigned to one of the side view images $C1, C2, \ldots CN$. A visibility test is applied for every triangle and a side view in order to ensure that the triangle is visible from the chosen side view. If the triangle is not visible from the chosen side view, an alternative side needs to be selected.

Because the triangles, even next to each other, are quite inhomogeneous, it is not uncommon that two neighboring triangles are assigned to two different side view images, which result in texture discontinuity between them if no further process is applied. For example, triangle 1202 is assigned to image C1, the neighboring triangle 1204 may be assigned to image C4 that is taken from a quite different view angle from image C1. At 1108, each triangle assigned to a side view image is mapped to/with the side view image for texturing, namely with the patch corresponding to the portion of texture information for the triangle. At 1110, a local blending process is applied to smooth those texture discontinuities. Additional information of process 1106,1108 and 1110 is provided by W. Niem, et al "Mapping Texture From Multiple Camera Views Onto 3D-Object Models for Computer Animation", the proceedings of the International Workshop on Stereoscopic and Three Dimensional Imaging, Sep. 6–8, 1995, Santorini, Greece.

As one of the important features in the present invention, the generation of exportable patches is introduced herein. A patch is a collection of triangles of the mesh with the property that every triangle in the patch shares at least one edge with some other triangle in the same patch. In addition, all patches have the properties that the union of all the patches contains all the triangles of the mesh, and that no two patches contain the same triangle. Exporting such patches in image files makes it possible for a user to alter or modify the texture mapping for a particular patch in a desirable way. For example, a 3D modeling system, typically, is not designed to model the bottom of a 3D object that is often assumed black or a color extended from what is on the bottom portion of the object. Consequently, the final 3D model loses its realism when its bottom is caused to be displayed. In other situations, users desire to remove certain reflections (e.g. speculums) caused by non-uniform illumination. With the generated textured patches, the user may use an image or graphics application, such as PhotoShop 5.0 from Adobe Systems, Inc. in San Jose, Calif., to manually alter or modify the textured patches. The editability of the texture mapping, and therefore the usability thereof increases tremendously if the mapping is performed in a fashion which maps neighboring triangles of a mesh to neighboring triangles in a texture image.

At 1112, therefore, a procedure is provided to generate one or more patches, alternatively, it is to subdivide the mesh into a patch or patches. The detail of 1112 is provided in FIG. 11B. At 1120 of FIG. 11B, an empty patch is created (i.e. a memory space is initiated) and indexed. At 1122, one of the triangles in the mesh model is chosen as a seed triangle. The seed triangle may be chosen randomly from the triangles that are not included in a patch yet or from a group of local triangles that demonstrate a similar normal. At 1124, neighboring triangles to the seed triangle are sequentially checked if they have been tested for suitability to be included in the patch that is to be described below. If the neighboring triangles are all tested, that means the patch is finished. Otherwise, the triangles are further respectively tested at 1126 to see if any of the triangles can be added to the patch.

Figure 12B:
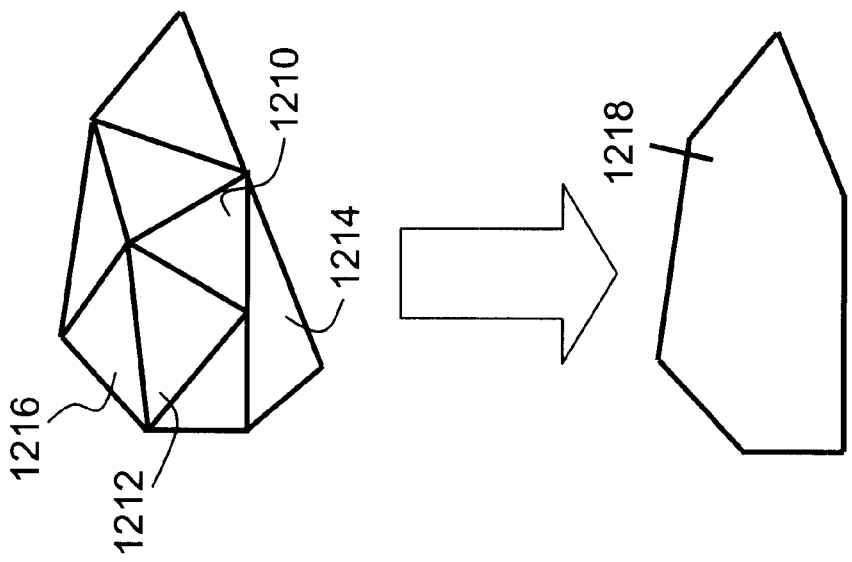
FIG. 12B illustrates that a patch is growing with every newly added triangle.
Figure 12A:
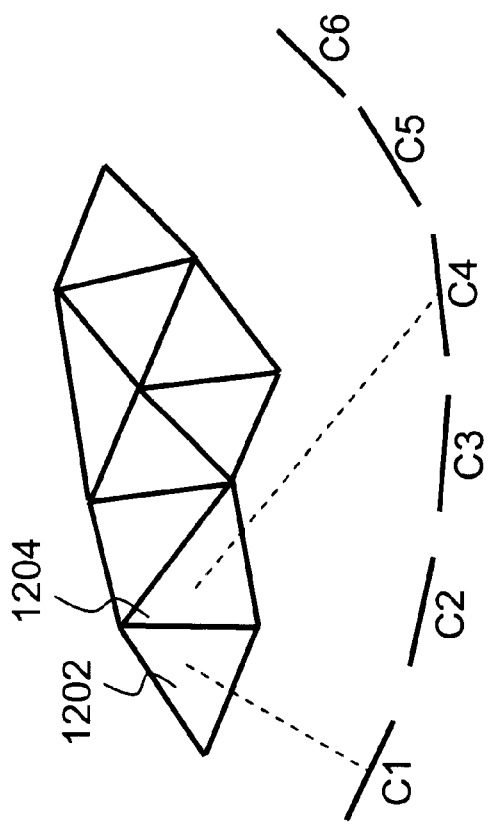
FIG. 12A shows a group of triangles being assigned to respective side view images.

To be specific, FIG. 12B illustrates that a patch is growing with every newly added triangle. For example, triangle 1210 is a seed triangle that begins the patch initiated at 1120. When a neighboring triangle 1212 has not been "tested", triangle 1212 will be tested to see if it shares at least one edge with the seed triangle. If it is not, it means that the triangle does not belong to the patch or that it may be added to the patch later in the process. As an example, neighboring triangle 1214 does not belong to the patch and will be thus discarded for the time being. If triangle 1212 shares one edge with triangle 1210.

Figure 11B:
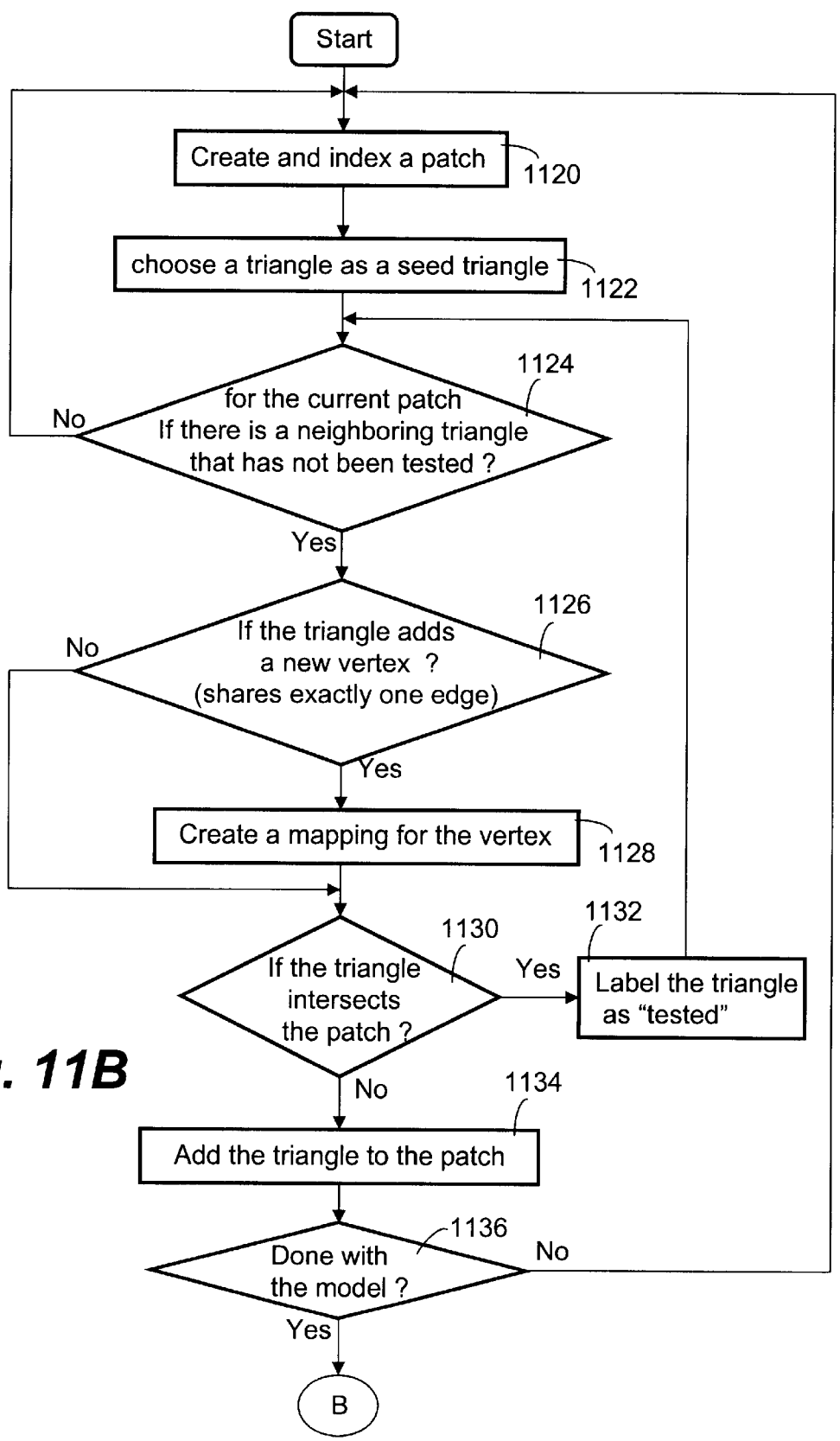
FIG. 11B shows a flowchart of the textured patch generation process according to one embodiment of the present invention.

A mapping is created therefore at 1128 of FIG. 11B. It should be emphasized that the particular mapping in the current embodiment is based on the orthographic projection from the 3D model to the texture image. For a particular patch, the projection is along the direction of the face normal of the seed triangle. Alternatively, the perspective projection may be used or any other suitable projections may be used.

At 1130, the accepted triangle is further tested to see if it intersects the patch. If it does, the triangle is labeled "tested", and the process goes to 1124 to test another triangle. If the triangle does not intersect the patch, it is now added to the patch at 1134 so that the patch grows one triangle bigger. The patch generation process permits to generate multiple patches. At 1136, it checks if the entire mesh model has been processed, namely expressed now in a number of patches. If there are still some triangles that have not been put into a patch, then the process goes to 1120 to generate a new patch.

It can be appreciated that the patch generation process in FIG. 11B can be implemented by a recursive programming and subsequently produces a number of mutually exclusive patches, each comprising a plurality of triangles that share at least one edge with other triangles in the patch.

At 1114, the process is to create texture image or images. These are the images that store the actual texture. The creation of this image requires that the textures stored for every triangle are projected into the image. In the current embodiment, we accelerate the process by using graphics accelerator architecture. If such architecture is not available, the architecture is emulated by software.

As a result, the shape of patch 1218 is formed and the textured triangles therein provide a textured patch that can be saved or exported at 1116 in a commonly used image format, such as TIFF (Tag Image File Format) or JPEG (Joint Photographic Experts Group), that can be opened by an image processing application such as PhotoShop. A user can repaint or modify any portion of the textured patch using the PhotoShop that provides sufficient graphic user interface to modify the patch at pixel level.

The process described above shows a method for creating contiguous texture patches. Rather than mapping texture to each of the triangles of the mesh model, the process chooses to map the texture from every triangle into a respective portion of the texture image. As another important features, the texture mapping process described herein can be implemented to take advantage of the graphics accelerator architecture commonly in most computer systems. Redirecting the graphics accelerator to draw into a buffer in memory rather than the buffer for the monitor can yield a much more efficient mapping of the textures.

The advantages of the invention are numerous. Several advantages that embodiments of the invention may include are as follows. One of the advantages is an economical and efficient 3D modeling system that is low in cost and easy to operate, virtually anywhere within minutes. The modeling system employing the present invention can be used and operated by an ordinary skilled person to generate fully-textured models of 3D objects within a limited time for many applications including Internet commerce and product designs. Another advantage is the MAE scheme that encodes all mask images to make the space carving process nearly independent of the size of images. Still another advantage is the process of generating a mesh model using neighborhood configuration that produces only valid triangles. Still another advantage is the texture mapping process that provides a mechanism to generate exportable patches comprising triangles that can be provided contiguous texture mapping without user intervention. Yet another advantage is the possible implementation of the texture mapping processing on graphics accelerator architecture to redirecte the graphics accelerator to draw into a buffer in memory rather than the buffer for a monitor, yielding a much more efficient mapping of the textures.

The present invention has been described in sufficient detail with a certain degree of particularity. It is understood to those skilled in the art that the present disclosure of embodiments has been made by way of examples only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. A method for generating a 3D region from a sequence of images taken respectively at a known position around an object, said method comprising:

converting said images respectively to corresponding mask images, each including a foreground and a background; said foreground being a silhouette of said object; and generating encoded images respectively from said corresponding mask images, an element at coordinates (i,j) in each of said encoded images representing an integral value describing a largest parallelogram having a substantially similar color as a pixel has at the coordinates (i,j) in one of said mask images corresponding to said each of said encoded images.

2. The method as recited in claim 1, wherein said parallelogram is of square shape.

3. The method as recited in claim 1 further comprising:

projecting a stack of volumetric cells with respect to each of said encoded images to determine if each of said projected volumetric cells is occupied, unoccupied or partially occupied by said foreground;

subdividing each of said partially occupied volumetric cells;

repeating said projecting and said subdividing up to a predefined degree of refinement controlling a resolution of said 3D region.

4. The method as recited in claim 3, wherein said subdividing comprises:

recording each of said volumetric cells as a node in a tree structure;

branching each of said nodes that represents one of said partially occupied volumetric cells to sub-nodes; and turning each of said sub-nodes to a leave when said repeating stops.

5. The method as recited in claim 4, wherein each of said partially occupied volumetric cells is subdivided into eight equally-sized smaller volumetric cells.

6. The method as recited in claim 5, wherein each of said smaller volumetric cells corresponds to one of sub-nodes in said tree structure.

7. The method as recited in claim 6, wherein each of said volumetric cells is a cube.

8. The method as recited in claim 7, wherein said tree structure is an octree having eight branches for each of said nodes therein.

9. A method for generating a 3D region from a sequence of images taken respectively at a known position around an object, said method comprising:

converting said images in a first color space to a second color space;

segmenting said images in said second color space, respectively, to produce corresponding mask images; each of said mask images including a foreground and a background; said foreground being a silhouette of said object;

generating encoded images respectively from said corresponding mask images, an element at coordinates (i,j) in each of said encoded images representing an integral value describing a largest parallelogram having a substantially similar color as a pixel has at the coordinates (i,j) in one of said mask images corresponding to said each of said encoded images;

projecting a stack of volumetric cells with respect to each of said encoded images to determine if each of said projected volumetric cells is occupied, unoccupied or partially occupied by said foreground;

subdividing each of said partially occupied volumetric cells; and repeating said projecting and said subdividing up to a predefined degree of refinement controlling a resolution of said 3D region.

10. The method as recited in claim 9; wherein said first color space is a RGB color space and each of said converted images in said second color space includes an intensity component.

11. The method as recited in claim 9; wherein said segmenting said images in said second color space comprises extracting an image portion representing only said object by suppressing other than said image portion from each of said images.

12. The method as recited in claim 9; wherein said mask image is in a binary format.

13. The method as recited in claim 12; wherein each of said volumetric cells is a cube.

14. The method as recited in claim 13; wherein each of said partially occupied volumetric cells is subdivided into eight equally-sized smaller volumetric cells.

15. The method as recited in claim 14; wherein each of said smaller volumetric cells corresponds to one of sub-nodes in a tree structure.

16. The method as recited in claim 15; wherein said tree structure is an octree having eight branches for each of said nodes.

17. A computer readable medium containing program code executable by a computing device for generating a 3D region from a sequence of images taken respectively at a known position around an object; said computer readable medium comprising:

first program code for converting said images respectively to corresponding mask images, each including a foreground and a background; said foreground being a silhouette of said object; and second program code for generating encoded images respectively from said corresponding mask images, an element at coordinates (i,j) in each of said encoded images representing an Integral value describing a largest parallelogram having a substantially similar color as a pixel has at the coordinates (i,j) in one of said mask images corresponding to said each of said encoded images.

18. The computer readable medium as recited in claim 17 further comprising:

third program code for projecting a stack of volumetric cells with respect to each of said mask images to determine if each of said projected volumetric cells is occupied, unoccupied or partially occupied by said foreground;

fourth program code for subdividing each of said partially occupied volumetric cells;

fifth program code for repeating said projecting and said subdividing up to a predefined degree of refinement controlling a resolution of said 3D region.

19. The computer readable medium as recited in claim 18, wherein said fourth program code further comprises:

program code for recording each of said volumetric cells as a node in a tree structure;

program code for branching each of said nodes that represents one of said partially occupied volumetric cells to sub-nodes; and program code for turning each of said sub-nodes to a leave when said repeating stops.

20. The computer readable medium as recited in claim 19; wherein each of said partially occupied volumetric cells is subdivided into eight equally-sized smaller volumetric cells.

21. The computer readable medium as recited in claim 20; wherein each of said smaller volumetric cells corresponds to one of sub-nodes in said a tree structure.

22. The computer readable medium as recited in claim 21; wherein each of said volumetric cells is a cube.

23. The computer readable medium as recited in claim 22; wherein said tree structure is an octree having eight branches for each of said nodes therein.

24. A computer readable medium containing program code executable by a computing device for generating a 3D region from a sequence of images taken respectively at a known position around an object; said computer readable medium comprising:

program code for converting said images in a first color space to a second color space;

program code for segmenting said images in said second color space, respectively, to produce corresponding mask images; each of said mask images including a foreground and a background; said foreground being a silhouette of said object;

program code for generating encoded images respectively from said corresponding mask images, an element at coordinates (i,j) in each of said encoded images representing an integral value describing a largest square having a substantially similar color as a pixel has at the coordinates (i,j) in one of said mask images corresponding to said each of said encoded images;

program code for projecting a stack of volumetric cells with respect to each of said mask images to determine if each of said projected volumetric cells is occupied, unoccupied or partially occupied by said foreground;

program code for subdividing each of said partially occupied volumetric cells; and program code for repeating said projecting and said subdividing up to a predefined degree of refinement controlling a resolution of said 3D region.

25. The computer readable medium as recited in claim 24; wherein said first color space is a RGB color space and said second color space is HIS color space.

26. The computer readable medium as recited in claim 25; wherein said program code for segmenting said images further comprises program code for extracting an image portion representing only said object by suppressing other than said image from each of said images, wherein said reference image is taken without said object.

27. The computer readable medium as recited in claim 26; wherein each of said partially occupied volumetric cells is subdivided into eight equally-sized smaller volumetric cells.

28. The computer readable medium as recited in claim 27; wherein each of said smaller volumetric cells corresponds to one of sub-nodes in said a tree structure.

29. The computer readable medium as recited in claim 28; wherein said tree structure is an octree having eight branches for each of said nodes.

30. The computer readable medium as recited in claim 24, wherein said program code is executable in a processor of a portable device.

* * * * *